(12) United States Patent
Taden et al.

(10) Patent No.: US 8,168,743 B2
(45) Date of Patent: May 1, 2012

(54) CURABLE BENZOXAZINE MACROMONOMERS, THEIR PREPARATION AND CURED PRODUCTS

(75) Inventors: Andreas Taden, Wittmund (DE); Ursula Tenhaef, Duesseldorf (DE); Stefan Kreiling, Dusseldorf (DE); Rainer Schoenfeld, Duesseldorf (DE); Stanley Leroy Lehmann, Martinez, CA (US)

(73) Assignees: Henkel AG & Co. KGaA, Duesseldorf (DE); Henkel Corporation, Rocky Hill, CT (US)

( * ) Notice: Subject to any disclaimer, the term of this patent is extended or adjusted under 35 U.S.C. 154(b) by 95 days.

(21) Appl. No.: 12/766,000

(22) Filed: Apr. 23, 2010

(65) Prior Publication Data

US 2010/0210787 A1 Aug. 19, 2010

Related U.S. Application Data

(63) Continuation of application No. PCT/US2008/013293, filed on Dec. 2, 2008.

(60) Provisional application No. 60/992,911, filed on Dec. 6, 2007.

(51) Int. Cl.
*C08G 64/00* (2006.01)
*C08G 63/02* (2006.01)
(52) U.S. Cl. ......... 528/162; 524/500; 524/595; 525/540
(58) Field of Classification Search .................. 524/500, 524/595; 525/540; 528/162
See application file for complete search history.

(56) References Cited

U.S. PATENT DOCUMENTS

2007/0007692 A1 1/2007 Lehmann
2010/0204385 A1* 8/2010 Kreiling et al. ............... 524/500

FOREIGN PATENT DOCUMENTS

WO 02-24782 3/2002
WO 03-072638 9/2003

OTHER PUBLICATIONS

International Search Report issued in connection with International Patent Application No. PCT/US2008/013293 mailed on Jul. 23, 2009, Jan. 24, 2012.
Yildirim, A. et al. Synthesis, characterization and properties of naphthoxazine-functional poly(propyleneoxide)s. European Polymer Journal. vol. 42, pp. 3006-3014 (2006).
Kiskan, B. et al. Design and synthesis of thermally curable polymers with benzoxazine functionalities. Macromolecular Symposia. vol. 245-46, pp. 27-33 (2006).
Polybenzoxazines-New high performance thermosetting resins: Synthesis and properties. Progress in Polymer Science. vol. 32, pp. 1344-1391 (2007).

* cited by examiner

*Primary Examiner* — Terressa Boykin
(74) *Attorney, Agent, or Firm* — Steven C. Bauman

(57) ABSTRACT

The invention relates to a curable benzoxazine macromonomer containing at least 3 benzoxazine rings and at least one aliphatic, heteroaliphatic, araliphatic, heteroaraliphatic, aromatic or heteroaromatic fragment, the fragment comprising a shortest atom chain containing at least 40 consecutive atoms between two benzoxazine nitrogen atoms or between two benzoxazine oxygen atoms, and said atom chain must not include any oxazine ring atoms ("soft fragment"). The invention further relates to cured products made thereof and a method or producing the same.

15 Claims, No Drawings

CURABLE BENZOXAZINE MACROMONOMERS, THEIR PREPARATION AND CURED PRODUCTS

FIELD OF THE INVENTION

The present invention relates to curable benzoxazine macromonomers, a method of preparing curable benzoxazine macromonomers and cured products obtained from the curable benzoxazine macromonomers. More particularly, the present invention relates to improving mechanical and thermal properties of benzoxazine monomers via incorporation of flexible molecule fragments into benzoxaine monomers.

DESCRIPTION OF THE PRIOR ART

Benzoxazine polymers lend themselves to making a wide variety of items such as molding compounds, towpregs, and prepregs by being compounded with reinforcing fibers. Benzoxazine polymers are desirable due to their excellent thermal stability and mechanical properties, minimal side reactions, and reasonably fast curing rates. At the same time, benzoxazine polymers have a relatively straightforward chemistry and can be made from reactants that are more economical than other thermoset polymers, such as bismaleimides, polyimides, and cyanate ester resins ranging in the same desired application temperature range as benzoxazine polymers. In comparison, a basic benzoxazine polymer well known in the art and made from two moles of aniline, one mole of bisphenol A, and four moles of formaldehyde has a very reasonable manufacturing cost.

There are several approaches making use of benzoxazine chemistry. In some approaches monobenzoxazines made from monophenols like phenol, monoamines like aniline and formaldehyde are employed to form polymers. However those compounds have low viscosity and undesirably high vapor pressure and the products obtained after curing show low crosslinking density.

Other approaches make use of so-called difunctional benzoxazines built either by reacting diamines with monophenols or diphenols with monoamines and formaldehyde. The advantage of those compounds over monobenzoxazines is their medium to high viscosity, low vapor pressure and reasonably high crosslinking density after curing.

In yet another approach, diamines and diphenols together with an appropriate amount of formaldehyde have been used to synthesize benzoxazines with more than two benzoxazine moieties per molecule.

In one study Takeichi, Kano & Agag (published in Polymer 46 (2005) pp. 12172-12180) investigated the influence of aliphatic diamines differing in chain length, which were used in the preparation of benzoxazines with bisphenol A and paraformaldehyde, on the elongation of break of the cured benzoxazine film. Compared to aromatic diamines they exhibit lower strength and modulus. However, the biggest of the long-chained aliphatic diamines investigated had a chain length of only six carbon atoms between the two amino groups.

US 2003/0023007 discloses low molecular weight primary aromatic amine end-capped benzoxazines and their use for producing molding compounds, towpregs and prepregs by being compounded with reinforcement fibers. However, the inventors made use of diamines and diphenols having relatively small molecular dimensions and the target product had a very low molecular weight due to extensive end-capping of the product.

Allen & Ishida (Journal of Applied Polymer Science, 101 (2006) pp. 2798-2809) investigated the effect of aliphatic diamine chain length on physical and mechanical properties of flexible polybenzoxazine resins was investigated. The longest diamine used in the synthesis of monobenzoxazines was 1,12-diamino dodecane.

In three publications of Japanese Patent Applications Nos. 2007-146070, 2007-154018 and 2007-106800 Yuji, Kazuo & Hatsuo presented benzoxazine monomers derived from formaldehyde, diphenols and different diamines. In JP-A 2007-154018 hexamethylene diamines with methyl group substituents on the hexamethylene chain were found to provide thermosetting resins, which excel in dielectric properties and having improved dielectric constant and reduced dielectric loss. The same improvement was found in JP-A 2007-106800 for alternatively employing a diamine containing an aliphatic radical with a benzene ring between the two amino groups. Finally a further alternative to solve the permittivity problem is published in JP-A 2007-146070 wherein as the only diamine in the preparation of the benzoxazines polysiloxane diamines with up to ten Si atoms are disclosed.

However, none of the before-mentioned benzoxazines is able to serve the need for a benzoxazine-based toughening additive to be used in a wide range of monobenzoxazine and/or dibenzoxazine based curable formulations as for example moulding compounds, composite materials, reactive adhesives and sealants and coating materials. In particular, thermosetting products exhibiting high tensile strength, high glass transition temperatures and high elastic modulus (modulus E) without simultaneously exhibiting inferior fracture toughness, notch impact resistance and strain at break are demanded. Therefore increasing fracture toughness, notch impact resistance and strain at break without loss of tensile strength, lowered glass transition temperatures and elastic modulus of such cured materials is one goal of the present invention.

Another goal of the invention is to provide toughening additives suitable to improve other resin matrices as for example epoxy resins, polyurethanes and phenolic resins in fracture toughness or to improve corrosion resistance of a large variety of formulations.

Yet another aim was to provide benzoxazine-based products which do not only serve the above mentioned needs as an additive, but which are also suitable to be used as a "stand-alone" product exhibiting thermoplastic processability and thermoset properties after curing. Such material can e.g. be used in injection moulding and reactive extrusion processes.

SUMMARY OF THE INVENTION

It was surprisingly found that the above needs can be served by a curable benzoxazine macromonomer containing at least 3 benzoxazine rings and at least one aliphatic, heteroaliphatic, araliphatic, hetereoaraliphatic, aromatic or heteroaromatic fragment, the fragment comprising a shortest atom chain containing at least 40 consecutive atoms between two benzoxazine nitrogen atoms or between two benzoxazine oxygen atoms, and said atom chain must not include any oxazine ring atoms ("soft fragment").

Such benzoxazine macromonomers of the present invention can be prepared from primary polyamines, preferably diamines and polyphenols, preferably diphenols of different chemical nature in the presence of formaldehyde or a formaldehyde releasing compound, such as paraformaldehyde, trioxane, polyoxymethylene, or formalin.

Whereas the benzoxazine macromonomers exhibit a thermoplastic behavior, the products obtained by curing the benzoxazine macromonomers are thermoset. The curing reaction can be carried out by heating with or without additional catalysts or additives; however at lower temperatures the use of a catalyst is necessary in most cases.

The curable benzoxazine macromonomers of the present invention may be linear or branched. Linear products are obtained by the use of diamines and diphenols. Incorporation of amines with more than two primary amino groups or polyphenols with more than two phenolic hydroxyl groups leads to branched macromonomers.

The term "benzoxazine macromonomer" as used in the present invention refers to an oligomer or polymer, comprising at least one polymerizable benzoxazine unit.

The term "polymerizable benzoxazine unit" refers to a structural element of an oligomer or polymer, comprising at least one benzoxazine ring, wherein the benzoxazine ring exhibits a ring-closed structure.

Part of the at least 3 benzoxazine rings in the curable benzoxazine macromonomer of the present invention can be "ring-opened" and will still be counted as benzoxazine ring in the meaning of the present invention, i.e. may have a structure

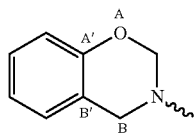

where the covalent bond between atom A and A' or atom B and B' is opened, rather than

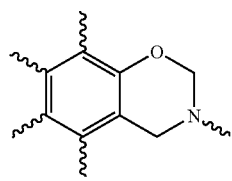

Further examples for ring-opened structures are given below.

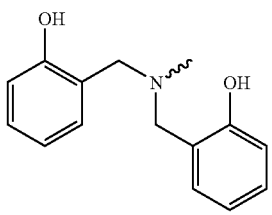

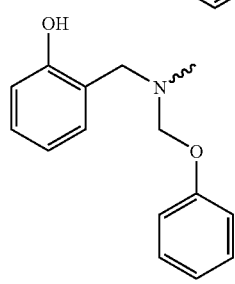

-continued

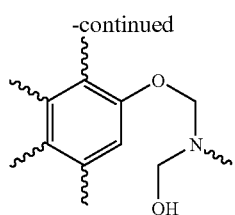

Since ring-opened structures are counted as benzoxazine ring in the meaning of the present invention, it follows that in counting atoms to determine the shortest atom chain, the atom chain must not include any ring-opened oxazine atoms.

The ring-opened structure influences the properties of the curable benzoxazine macromonomer in that it renders it less rigid and exhibiting improved ductility. The number of ring-opened structures is usually not more than 60%, preferably not more than 40% and most preferably not more than 20% of the total number of ring-closed and ring-opened benzoxazine structures.

Using different combinations of polyamines and/or polyphenols, the properties, such as glass transition temperature, viscosity and solubility of the thermoplastic curable benzoxazine macromonomers can be varied in a wide range. Therefore the benzoxazine macromonomers of the present invention can be fluid to solid and the glass transition temperature of the cured materials can be varied from about −100° C. to far more than 200° C. Even cured material having more than one glass transition temperature can be obtained. Choosing one or more different, long-chained, so-called "soft" fragments having the above-mentioned at least 40-atom-chains allows the adjustment of miscibility and compatibility to various resins as well as the adjustment of inner phase structures of different resins, when the curable benzoxazine macromonomer is used as additive, such as a toughener to improve impact resistance and to give a high glass transition temperature and elastic modulus simultaneously.

The curable benzoxazine macromonomers of the present invention excel by their good resistance to solvents and good storage stability at room temperature and even up to 40 to 60° C. They further show a reduced cold flow.

It is another object of the present invention to provide a method of preparing a curable benzoxazine macromonomer in a solvent, the reactants including at least one polyphenol, at least one primary polyamine and formaldehyde or a reactant releasing formaldehyde, comprising: combining said reactants, heating the mixture of said reactants under reflux, removing water from the reaction mixture, and separating the curable benzoxazine macromonomer from the solvent, whereby at least one of the polyphenols is such, that the shortest atom chain between two phenolic hydroxyl groups contains at least 40 atoms; and/or at least one of the primary polyamines is such, that the shortest atom chain between two primary amino groups contains at least 40 atoms.

The present invention further provides resinous compositions comprising the curable benzoxazine macromonomer and at least one further cured or curable resin. It is a further object of the present invention to provide the curable benzoxazine macromonomer of the present invention for use as toughening agent or toughening additive in resinous compositions.

Yet another object of the present invention is to provide a cured product made from the curable benzoxazine macromonomer or containing the cured benzoxazine macromonomer.

DETAILED DESCRIPTION OF THE INVENTION

The curable benzoxazine macromonomer of the present invention contain at least 3, more preferably at least 5 and most preferably at least 7 benzoxazine rings and at least one aliphatic, heteroaliphatic, araliphatic, hetereoaraliphatic, aromatic or heteroaromatic "soft" fragment. The "soft" fragment contains as shortest atom chain to connect two benzoxazine nitrogen atoms or two benzoxazine oxygen atoms, an atom chain of at least 40 consecutive atoms, preferably at least 50 consecutive, more preferably at least 70 consecutive atoms and most preferably at least 100 consecutive atoms. However said atom chain must not include any oxazine ring atoms, ring-opened or not.

The counting of the shortest atom chain between two benzoxazine nitrogen atoms can be exemplified on the following structure:

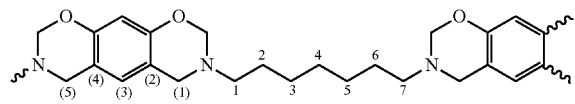

The shortest atom chain contains 7 consecutive atoms. Since the shorter atom chain containing 5 consecutive atoms marked with numbers in brackets includes oxazine ring atoms (atom marked (1)) it is not an allowable atom chain in determining the shortest atom chain.

The counting of the shortest atom chain between two benzoxazine oxygen atoms can be exemplified on the following structure:

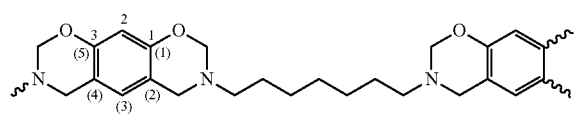

The shortest atom chain contains 3 consecutive atoms. The atom chain containing 5 consecutive atoms marked with numbers in brackets is longer and therefore not the shortest atom chain. An atom chain including any oxazine atoms is again not allowable in determining any atom chain length.

The minimum length of the at least one fragment in the curable benzoxazine macromonomer, which comprises a shortest atom chain containing at least 40 consecutive atoms between two benzoxazine nitrogen atoms or between two benzoxazine oxygen atoms, and which must not include any oxazine ring atoms, ensures the fragment being flexible enough to fulfill the requirements required from the curable benzoxazine macromonomers of the present invention.

However it was surprising that benzoxazines containing only fragments with shorter atom chains are not sufficient to give such a wide spectrum of products combining the advantageous properties without deteriorating other properties. On the other hand it could not be expected that even a high content of "soft" fragments of e.g. 50% by weight based on the total weight of the curable benzoxazine macromonomer or even higher, such as 70 or 80% by weight will result in products, that are still sufficiently cross-linkable and can even serve as tougheners for other resinous formulations.

The chemical constitution of the soft fragments can vary in very wide ranges and can e.g. be chosen from polyethers, polyesters, polyurethanes, poly(meth)acrylates, polybutadienes and the like, as well as polydialkylsiloxanes or hydrocarbon residues containing siloxanes. Besides polymers, long-chain oligomers and monomers can be used as well. In general the soft fragment is freely customizable and can e.g. be built by polyurethane chemistry.

If the curable benzoxazine monomer of the present invention is to be used as toughener it can be desirable to include a mixture of two or more soft fragments within one curable benzoxazine macromonomer of the present invention to adjust the properties to be compatible with the resin matrix in which the curable benzoxazine macromonomer of the present invention is to be incorporated.

In general the soft fragments are introduced into the curable benzoxazine macromonomer of the present invention by the choice of the primary polyamines and polyphenols.

The term "primary polyamine" describes a compound containing at least two primary amino groups.

The term "polyphenol" describes a special kind of polyol, being an aromatic compound containing at least two phenolic hydroxyl groups in the molecule. A "phenolic hydroxyl group" is considered any hydroxyl group bound to a benzene or naphthaline residue. The at least two phenolic hydroxyl groups can be bound to the same or different benzene or naphthaline residues and at least one of the carbon atoms adjacent to the carbon atom to which the phenolic hydroxyl group is bound has to be bound to hydrogen (—CH=).

The preferred primary polyamines and polyphenols are diamines and diphenols.

In a diamine or a diphenol the soft fragment equals the fragment between the two amino groups and the two phenolic hydroxyl groups, respectively, and the shortest atom chain containing 40 consecutive atoms is the shortest atom chain between the two amino groups and the two phenolic hydroxyl groups, respectively.

An example for the calculation in a triphenol (Trisphenol PA) is given below:

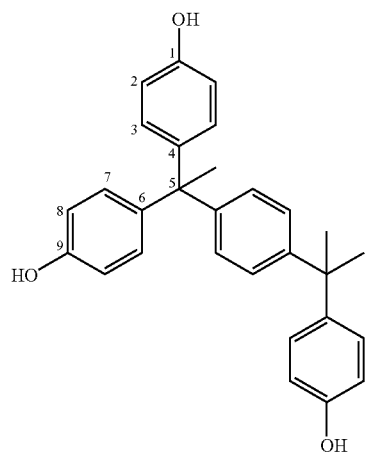

The meaning of the term "shortest atom chain between two phenolic hydroxyl groups" can easily be demonstrated for the above Trisphenol PA. The shortest atom chain between two phenolic hydroxyl groups is the atom chain, wherein the atom chain is marked with numbers "1" to "9", starting with the carbon atom marked "1" and ending with the carbon atom marked "9". The carbon atom to which the third hydroxyl group is attached is separated from either carbon atom marked "1" or "9" by 14 carbon atoms. Therefore the atom chain between the third hydroxyl group and any one of the other hydroxyl groups contains 14 carbon atoms and is accordingly not the shortest atom chain between two phenolic hydroxyl groups. However Trisphenol PA is not suitable as the "at least one polyphenol, wherein the shortest atom chain between two phenolic hydroxyl groups contains at least 40 atoms", since the shortest carbon atom chain contains only 9 carbon atoms.

Polyphenols meeting the requirement, that the shortest atom chain between two phenolic hydroxyl groups must contain at least 40 atoms can easily be synthesized from long chain compounds sufficiently long, that the shortest atom chain between terminal groups after terminal group modification with a phenolic hydroxyl group compound meets the above requirement. Exemplified for a diphenol as target compound it can for example be started with an α,ω-hydroxyl terminated polyether diol, polyester diol or polybutadiene diol, reacting said polymer with a diisocyanate to obtain an α,ω-isocyanate terminated polymer and reacting said two isocyanate groups each with one of the above mentioned diphenols or an aminophenol. The chain length of the polyether diol, polyester diol or polybutadiene diol should be chosen so, that after the addition of diisocyanate and diphenol or aminophenol at the respective terminal ends, the shortest atom chain between the two phenolic hydroxyl groups contains at least 40 atoms.

Heteroaliphatic diamines satisfying the requirement that the shortest atom chain between two primary amino groups must contain at least 40 atoms are e.g. $NH_2$—[$CH(CH_3)$ $CH_2$—$O]_{33}$—$CH_2$—$CH(CH_3)$—$NH_2$ (Jeffamine® D-2000; Huntsman Corp.) or $H_2N$—$(CH_2)_3$—$Si(CH_3)_2$-[O—$Si(CH_3)_2]_{34-41}$—$(CH_2)_3$—$NH_2$ (reaktives Siliconöl, Fluid NH 40 D, Wacker Chemie AG).

Aromatic diamines satisfying the requirement that the shortest atom chain between two primary amino groups must contain at least 40 atoms are e.g. $NH_2$-(p-Ph)—CO—[O—$(CH_2)_4]_{9-10}$—O—CO-(p-Ph)—$NH_2$ (p-Ph=para-phenylen; Versalink® P 650, Air Products) and $NH_2$-(p-Ph)—CO—[O—$(CH_2)_4]_{13-14}$—O—CO-(p-Ph)—$NH_2$ (p-Ph=para-phenylen; Versalink® P 1000, Air Products). An example for an heteroaliphatic triamine satisfying the requirement that the shortest atom chain between two primary amino groups must contain at least 40 atoms is e.g. a glycerol-started poly(oxypropylene) triamine, wherein the sum of the oxypropylene residues of all three chains is approximately 50 (Jeffamine® T-3000, Huntsman).

The polyphenol or primary polyamine used to introduce the soft fragment into the curable benzoxazine macromonomer of the present invention preferably has a weight average molecular weight of at least about 600 to about 20,000 g/mol and more preferably at least about 800 to about 5,000 g/mol and even more preferably at feast about 900 to about 4,000 g/mol. The weight average molecular weight can be determined by gel permeation chromatography (GPC) using a polystyrene standard.

In case the soft fragment has a weight average molecular weight lower than 600 g/mol flexibilisation is decreased and the improvement in solubility and meltability is decreased. In case the soft fragment has a higher molecular weight copolymerization with other matrix resins is made difficult and curing in stand-alone applications may become difficult.

The glass transition temperatures of the soft fragment or soft fragments of the curable benzoxazine macromonomer of the present invention are preferably lower than about 100° C., more preferably lower than about 60° C. and most preferably lower than about 25° C. The glass transition temperature can be determined by differential scanning calorimeter and the transition peak assignment can be carried out by comparative measurements.

The weight average molecular weight of the curable benzoxazine macromonomer of the present invention preferably ranges from about 2,000 to about 1,000,000 g/mol, more preferably from about 3,000 g/mol to about 500,000 g/mol and most preferably about 5,000 to about 400,000 g/mol. The weight average molecular weight can be determined by gel permeation chromatography (GPC) using a polystyrene standard. In case the molecular weight is higher than 1,000,000 g/mol viscosity is deteriorating processability. In case the molecular weight is below 2,000 g/mol the use of the compounds as tougheners is decreased.

One big advantage of the present invention over the prior art benzoxazine chemistry is to provide a "tool box" system to customize curable benzoxazine macromonomers for a large variety of purposes in a large variety of technical fields. The employment of soft fragments having different solubility parameters increases compatibility with many resinous formulations in which the curable benzoxazine macromonomers of the present invention can be used as reactive additives such as tougheners.

If for example a polyethylene oxide chain is used as a soft fragment, the curable benzoxazine macromonomers of the present invention will be more hydrophilic compared to polydimethyl siloxane chains as a soft segment. However there is a wide range of possibilities to choose from in between the two extremes. One skilled in the art knows that hydrophobicity of polymeric chains is increased in the following order: polyethylene oxide, polypropylene oxide, polytetrahydrofuran, polybutadiene to polydimethyl siloxane. It is further known that a homopolymer of ethylene oxide can be hydrophobized by copolymerization with propylene oxide to obtain a polymeric chain with a polarity between polyethylene oxide and polypropylene oxide.

Moreover hydrophobicity and hydrophilicity, respectively, and therewith compatibility to other resinous formulations, can also be adjusted by not only incorporating one kind of soft fragment into the curable benzoxazine macromonomers of the present invention, but by incorporating two or more different soft fragments. Moreover molecular weight, chain length and structure influence hydrophilicity and hydrophobicity.

Since varying the weight fractions of soft fragments is very easy and allows to use soft fragments the monomers of which are not copolymerizable, it is preferred to incorporate two or more different soft fragments into the curable benzoxazine macromonomers of the present invention. The different soft fragments can be incorporated into the curable benzoxazine macromonomers of the present invention by using two or more different soft fragment containing polyamines having primary amino groups, by using two or more different soft fragment containing polyphenols or by using a mixture of at least one soft fragment containing polyamine having primary amino groups with at least one polyphenol containing another soft fragment. Of course the ratio of the soft fragment containing reactants can also be varied to have a maximum degree of freedom in varying different soft fragments.

In the same way soft fragments are defined, it is possible to define "hard" fragments of the curable benzoxazine macromonomers of the present invention on basis of the atom chain length and molecular weight. The hard fragments (also called "rigid" fragments) contain as shortest atom chain to connect two benzoxazine nitrogen atoms or two benzoxazine oxygen atoms, an atom chain of less than 40 consecutive atoms. However said atom chain must not include any oxazine ring atoms. In general it can be stated that the hard character of hard fragments is more distinct the shorter the atom chain is. Preferably the hard fragment contains as shortest atom chain to connect two benzoxazine nitrogen atoms or two benzoxazine oxygen atoms, an atom chain of less than 25, even more preferable less than 20 and most preferable less than 15 consecutive atoms.

Most preferred rigid polyphenols are rigid diphenols. The most simple of such diphenols are 1,2-dihydroxy benzene, 1,3-dihydroxy benzene and 1,4-dihydroxy benzene. A diphenol with two phenolic hydroxyl groups attached to different benzene residues is, e.g. biphenyl-4,4'-diol (also known as "4,4'-Biphenol"). Other suitable examples for diphenols are, e.g. Bisphenol A, Bisphenol P, Bisphenol M, Bisphenol F, Bisphenol S, Bisphenol AP, Bisphenol E, 4,4'-oxydiphenol, 4,4'-thiodiphenol, bis(4-hydroxyphenyl)methanone, biphenyl-2,2'-diol, 4,4'-(cyclohexane-1,1-diyl)diphenol or 4,4'-(3,3,5-trimethylcyclohexane-1,1-diyl)diphenol (Bisphenol TMC).

Examples for rigid aliphatic diamines are alkylene diamines like ethane-1,2-diamine, propane-1,3-diamine, propane-1,2-diamine, 2,2-dimethylpropane-1,3-diamine and hexane-1,6-diamine, or aliphatic diamines containing cyclic structures like 4,4'-methylenedicyclohexanamine (DACHM), 4,4'-methylenebis(2-methylcyclohexanamine) (Laromin C260) and 3-(aminomethyl)-3,5,5-trimethylcyclohexanamine (isophorone diamine (IPDA)).

Examples for rigid heteroaliphatic diamines are $H_2N$—$(CH_2)_3$—$N(CH_3)$—$(CH_2)_3$—$NH_2$, $H_2N$—$(CH_2)_3$—$O$—$(CH_2)_4$—$O$—$(CH_2)_3$—$NH_2$, $NH_2$—$[CH(CH_3)CH_2$—$O]_{2.5}$—$CH_2$—$CH(CH_3)$—$NH_2$ (Jeffamine® D-230; Huntsman Corp.), $NH_2$—$[CH(CH_3)CH_2$—$O]_6$—$CH_2$—$CH(CH_3)$—$NH_2$ (Jeffamine® D-400; Huntsman Corp.) and $H_2N$—$(CH_2)_3$—$Si(CH_3)_2$—$[O$—$Si(CH_3)_2]_{10-15}$—$(CH_2)_3$—$NH_2$ (reactive silicon oil, Fluid NH 15 D, Wacker Chemie AG).

An example for a rigid araliphatic diamine is m-xylylene diamine (MXDA).

Examples for rigid aromatic diamines are benzene-1,3-diamine, benzene-1,4-diamine, 4,4'-methylenedianiline, 4,4'-oxydianiline, 4,4'-thiodianiline, 4,4'-sulfonyldianiline, 3,3'-sulfonyldianiline, 4,4'-(2,2'-(1,4-phenylene)bis(propane-2,2-diyl))dianiline (Bisaniline P) and $NH_2$-(p-Ph)—CO—[O—$(CH_2)_4]_{3-4}$—O—CO-(p-Ph)—$NH_2$ (p-Ph=paraphenylen; Versalink® P 250, Air Products).

The polyamine or polyphenol used to introduce the hard fragment into the curable benzoxazine macromonomer of the present invention preferably has a molecular weight of less than about 600 g/mol. More preferably the molecular weight is about 46 to about 500 g/mol and even more preferably at least about 60 to about 450 g/mol. The molecular weight can be determined by mass spectrometry.

From the above-mentioned examples for rigid diphenols and rigid primary diamines all examples but one fulfill the preferred requirement to have a molecular weight of less than 600 g/mol. The only exception is the reactive silicon oil Fluid NH 15 D having a higher molecular weight. Even though its molecular weight is more in the range of soft fragment containing diamines and some of its properties may qualify it to be classified as a soft fragment containing diamine it is herein classified as a "rigid" diamine due to its atom chain of about 27 to 39. Consequently this compound is not employed as single a source of soft fragment in the present invention.

For most purposes it is preferred that the content of soft segments in weight-% based on the total weight of the curable benzoxazine macromonomer of the present invention is at least about 20% by weight, more preferably at least about 50% by weight and most preferably at least about 80% by weight.

Particularly preferred structures of curable benzoxazine macromonomers of the present invention are described by the following formal description.

In a preferred embodiment the curable benzoxazine macromonomer of the present invention, contains covalently bound fragments of the following general formula (I)

wherein the asterisk symbols (*) at the carbon, oxygen and nitrogen atoms depict attachment sites to fragments A and B of the curable benzoxazine macromonomer, fragments A and B being formally attached to the fragment of general formula (I) via single covalent bonds, in that the following formal attachment procedure is carried out:

(a) first at least n fragments of general formula (I) are attached each via their carbon and oxygen attachment sites to adjacent carbon atom attachment sites on one or more benzene or naphthalene residues, which constitute fragment A or which are part of a fragment A to obtain benzoxazine moieties containing n nitrogen attachment sites, whereby n is an integer of two or more; and (b) secondly attaching each of n fragments B having independently m attachment sites, via one of the m attachment sites to one of the nitrogen attachment sites of the fragment obtained in (a), whereby m is an integer of two or more;

(c) thirdly attaching to the n (m-1) residual attachment sites of the fragment obtained in (b) n (m-1) fragments independently obtained according to (a) via the nitrogen attachment sites of the fragments obtained according to (a);

(d) subsequently carrying out (b) and (c) repeatedly until the desired length of the resulting benzoxazine macromonomer is reached, whereby the last repetition ends with (b) or (c); and (e) attaching to any remaining attachment site H, OH or $NH_2$.

The one or more of fragments A and B being so constituted, that the shortest chain of atoms between any two attachment sites of said one or more fragments to the oxygen attachment site of the fragment with general formula (I) in case of fragment A and to the nitrogen attachment site of the fragment with general formula (I) in case of fragment B consists of at least 40 atoms.

Particularly preferred fragments A are selected from the group consisting of

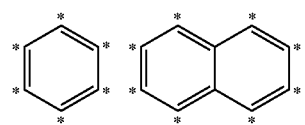

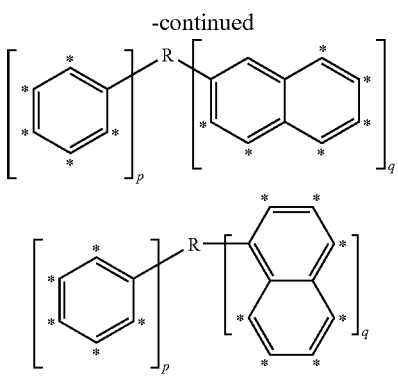

wherein
any two adjacent carbon atoms marked with asterisk symbols (*) may serve as attachment sites to the carbon and oxygen attachment sites of the fragments of general formula (I) and the remaining carbon atoms marked with asterisk symbols (*) are attached to a residue selected from the group consisting of H, a substituted or unsubstituted aliphatic or heteroaraliphatic hydrocarbon with 1 to B carbon atoms, a substituted or unsubstituted araliphatic or heteroaraliphatic hydrocarbon with 6 to 12 carbon atoms, a substituted or unsubstituted aromatic or heteroaromatic hydrocarbon with 6 to 12 carbon atoms, OH, $NH_2$ or halogen;
the sum of p+q being an integer of two or more;
R being a residue selected from the group consisting of monomeric, oligomeric and polymeric, substituted or unsubstituted, straight-chain or branched, aliphatic, heteroaliphatic, araliphatic, heteroaraliphatic, aromatic or heteroaromatic hydrocarbon residues, siloxane or polysiloxane residues, whereby any of the before-mentioned residues R optionally further contains one or more ester, urethane, urea or ether groups;
and in case p+q=2 the residues R are may also be a single covalent bond directly connecting the thereto attached residues.

Preferred fragments B are selected from the group consisting of monomeric, oligomeric and polymeric, substituted or unsubstituted, straight-chain or branched, aliphatic, heteroaraliphatic, araliphatic, heteroaraliphatic, aromatic or heteroaromatic hydrocarbon residues and siloxane or polysiloxane residues, whereby any of the before-mentioned residues optionally further contains one or more ester, urethane, urea or ether groups. Most preferred fragments B can be derived from the above described primary polyamines, if the primary amino groups are replaced by "attachment sites".

In one preferred embodiment fragments A are based on one or more benzene fragments only, i.e. they do not contain a naphthaline fragment (q=0). Most preferred are those fragments A wherein p=2 to 6, even more preferable 2 or 3 and q=0. Such structure can be derived from the above described polyphenols, if the phenolic hydroxyl groups are replaced by "attachment sites".

Further object of the present invention is to provide a method of preparing a curable benzoxazine macromonomer, preferably a benzoxazine macromonomer according to the present invention as disclosed above, in a solvent, the reactants including at least one polyphenol, at least one primary polyamine and formaldehyde or a reactant releasing formaldehyde, comprising
  (i) combining said reactants,
  (ii) heating the mixture of said reactants under reflux,
  (iii) removing water from the reaction mixture, and
  (iv) separating the curable benzoxazine macromonomer from the solvent, whereby
  a. at least one of the polyphenols is such, that the shortest atom chain between two phenolic hydroxyl groups contains at least 40 atoms; and/or
  b. at least one of the primary polyamines is such, that the shortest atom chain between two primary amino groups contains at least 40 atoms.

In a preferred embodiment of the inventive method the reaction is carried out under inert gas atmosphere and/or
  (a) combining the reactants is carried out at a temperature no warmer than about 10° C., and/or
  (b) heating the mixture of said reactants under reflux is carried out for 1 to 10 hours, and/or
  (c) removing water from the reaction mixture is carried out by azeotropic distillation.

In particular, a reaction vessel is kept at a temperature of no warmer than about 250° C., preferably no warmer than about 150° C. and most preferably no warmer than about 10° C. while the reactants are added, preferably under an inert gas atmosphere, such as nitrogen gas. The reaction vessel may be cooled with ice, or any other cooling mechanism. The reactants can be dissolved or dispersed in solvents, such as toluene and/or ethyl acetate, preferably before adding to the vessel. Most preferably the reactants are added in small amounts to ensure that the temperature is maintained as desired.

One preferred solvent is a mixture of toluene and ethyl acetate. It is preferred that the ratio of toluene/ethyl acetate be about 8:1 to about 6:1. However, any combination of the aforementioned solvents from about 10:1 to about 4:1 may be employed. Using a combination of solvents is advantageous in that the collection of water by azeotropic distillation is expedited. The combination of solvents is also advantageous in that it allows the separation of water from solvent in a Barrett or Dean-Stark distillation trap to be sharp and allowing nearly all the solvent to be returned to the reaction vessel. However, depending on the solubility of the benzoxazine macromonomer it can also be preferred to use only toluene as a solvent.

Other solvents such as xylene, cyclohexane and chloroform, or water soluble solvents as tetrahydrofuran, dioxane, ethanol or propanol can also be used, however, the water soluble solvents being less preferred, since they are not suitable if the final product is to be separated and purified by washing procedures with aqueous solutions.

In general the reaction mixture is slowly warmed to a temperature at which an exothermic reaction in form of rapid boiling occurs. The vessel is maintained under reflux for about 1 to about 10 hours, preferably 2 to 8 hours and most preferably 4 to 7 hours.

The water byproduct is collected by any method conventional in the art, such as via a Barrett trap. If appropriate, further solvent forming an azeotropic mixture with water, such as toluene or ethyl acetate, may be added during boiling under reflux. Following the above procedure, the yield of the curable benzoxazine macromonomer ranges generally from 90 to 100% of the theoretical yield.

If terminal primary amino groups or terminal phenolic hydroxyl groups should be end-capped, the reaction mixture is cooled down and a compound reactive to primary amino groups or phenolic hydroxyl groups is added, e.g. an isocyanate compound. However terminal primary amino groups can be reacted with monophenols and terminal phenolic hydroxyl groups with monoamins in the presence of formaldehyde or a formaldehyde releasing compound, analogous to the above describe procedure, to yield benzoxazin end-capped benzoxazine macromonomers.

After boiling under reflux the reaction mixture is cooled down and the reaction product is separated from the solvents. The separation can be carried out by washing the reaction mixture, preferably repeatedly, with water and/or 1 N aqueous solution of sodium hydrogen carbonate, separating the organic phase, and optionally washing the organic phase, preferably repeatedly, with a 10% by volume solution of ethanol in water, drying the organic solution and evaporating the organic solvent.

To obtain curable benzoxazine macromonomer of the present invention having a high molecular weight it is necessary that the stoichiometric ratio of primary amino groups in the polyamine to phenolic hydroxyl groups in the polyphenol is preferably in the range of 0.5 to 2.0, more preferably 0.6 to 1.4, even more preferable 0.8 to 1.2 and most preferable about 1 or about 1.2. Therefore, if only diamines and diphenols are used to prepare the curable benzoxazine macromonomer of the present invention it is preferred to use the diamines and diphenols in an about equimolar ratio.

Another possibility to obtain the curable benzoxazine macromonomer of the present invention, having a molecular weight as high as described above, is to incorporate an amount of polyamine or polyphenol with more than two primary amino groups and/or more than two phenolic hydroxyl groups, respectively. This will lead to branched and sometimes even partly crosslinked curable benzoxazine macromonomers having high molecular weight. However, if curable benzoxazine macromonomers having good solubility in a wide range of solvents and exhibiting good processability are desired, the sum of the amounts of polyamines with more than two primary amino groups and polyphenols with more than two phenolic hydroxyl groups should be kept low. Preferably the amount of such compounds should not exceed 20% by weight, more preferably 10% by weight, based on the total weight of polyamines with primary amino groups and polyphenols.

To form one benzoxazine ring, one primary amino group, one phenolic hydroxyl group and two formaldehyde molecules are necessary. However it is preferred to use the formaldehyde in excess, the excess preferably being 10% by mol, if a higher degree of ring-closed structures in the curable benzoxazine macromonomer of the present invention is desired.

Although all the formaldehyde may be provided as formalin, this is an undesirable method because formalin is expensive and it introduces an unnecessary amount of water into the system which must be removed later. However employing formalin in addition to paraformaldehyde in preparing the benzoxazine monomer is advantageous. Paraformaldehyde is preferred as it is significantly less expensive than formalin. Employing formalin in combination with the paraformaldehyde provides enough water and methanol to dissolve the paraformaldehyde. Alternatively, just water may be used. Formalin is also advantageous in that it mitigates the exotherm reaction that occurs at about 80° C. to 85° C. A violent exotherm reaction occurs because as water is generated more paraformaldehyde can dissolve, thus rapidly accelerating the reaction rate. Thus it is advantageous to employ a paraformaldehyde/formalin ratio of at least 1:1, based on the dry weight of the formaldehyde, and preferably of about 8:1 and more. However taking into account the abovementioned drawback, formaldehyde can be employed in water-free form such as paraformaleyhde, trioxane or polyoxymethylene only, paraformaldeyde being most preferred.

Another embodiment of the present invention relates to cured products and the curable formulations containing the curable benzoxazine macromonomers of the present invention to produce the cured products. If the curable benzoxazine macromonomers of the present invention are contained as the only or predominant curable ingredient, products are obtained which are called stand-alone products. Such products exhibit excellent elastic properties, are thermally stable up to temperatures preferably as high as 280° C. and are suitably employable in injection molding and extrusion processes to obtain adhesives and in particular sealants. "Predominant" meaning that at least about 80% by weight, more preferably at least 90% by weight based on the total amount of curable ingredients, are curable benzoxazine macromonomers of the present invention.

If the cured product of the invention is a stand-alone product, the content of soft fragments is preferably in the range of 5 to 50% by weight, more preferably 10 to 40% by weight and most preferably 20 to 30% by weight based on the total weight of the curable benzoxazine macromonomers of the present invention in the stand-alone product.

One of the most surprising results was that the curable benzoxazine macromonomers of the present invention are highly suitable as tougheners in curable compositions comprising other curable ingredients than the curable benzoxazine macromonomers of the present invention. The term "other curable ingredients than the curable benzoxazine macromonomers of the present invention" means any kind of self-curable ingredients or curable ingredients, which cure by reaction with the curable benzoxazine macromonomers of the present invention.

Therefore yet another preferred embodiment of the present invention relates to curable formulations containing the curable benzoxazine macromonomers and other curable ingredients, and the cured products thereof. The content of the curable benzoxazine macromonomers of the present invention is less than 80% by weight based on the total amount of curable ingredients, to distinguish those formulations from the stand-alone formulations. However, it is preferred that the curable ingredients other than the curable benzoxazine macromonomers of the present invention are the main curable ingredients. Most preferably the content of the curable ingredients other than the curable benzoxazine macromonomers of the present invention is at least 60% by weight and even more preferable at least 70% by weight, such as at least 80% by weight based on the total amount of curable ingredients.

Curable ingredients other than the curable benzoxazine macromonomers of the present invention can be any other kind of benzoxazines not falling within the scope of the curable benzoxazine macromonomers of the present invention, for example benzoxazine macromonomers not containing soft fragments, dibenzoxazines, monobenzoxazines, or mixtures of the before-mentioned benzoxazines.

In a particularly preferred embodiment of the present invention the further curable ingredients other than the curable benzoxazine macromonomers of the present invention are selected from the group consisting of dibenzoxazines and mixtures of dibenzoxazines with monobenzoxazines.

Suitable dibenzoxazines as curable ingredients are selected from the group of aliphatic dibenzoxazines and aromatic dibenzoxazines. The term "aliphatic dibenzoxazine" refers to the nature of the residue which is directly bound to the nitrogen of the oxazine ring. An example is:

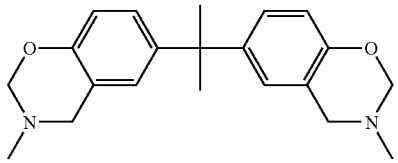

The methyl residues bound to the oxazine nitrogens are obviously aliphatic. However the term "aliphatic dibenzoxazine" does also include heteroaliphatic residues attached to the oxazine nitrogen.

The term "aromatic dibenzoxazine" also refers to the nature of the residue which is directly bound to the nitrogen of the oxazine ring. An example is MDA-phenyl benzoxazine:

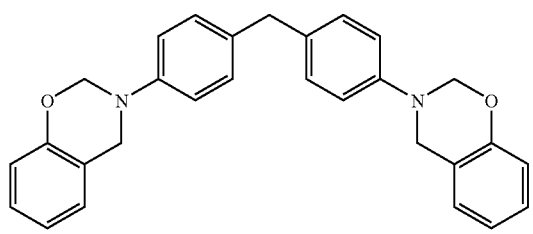

MDA-phenyl benzoxazine

The phenyl residues directly bound to the oxazine nitrogens are obviously aromatic. However the term "aromatic dibenzoxazine" does also include heteroaromatic residues attached to the oxazine nitrogen.

Suitable monobenzoxazines as curable ingredients other than the curable benzoxazine macromonomers of the present invention are selected from the group of aliphatic monobenzoxazines and aromatic monobenzoxazines. The terms "aliphatic" and "aromatic" are used as for the respective dibenzoxazines.

The above and even further examples for monobenzoxazines and polybenzoxazines and in particular dibenzoxazines being suitable in the present invention as further curable ingredients other than the curable benzoxazine macromonomers of the present invention are described in the following.

The further benzoxazine component can be any curable monomer, oligomer or polymer comprising at least one benzoxazine moiety. Preferably monomers containing up to four benzoxazine moieties are employed as the benzoxazine component in form of single compounds or mixtures of two or more different benzoxazines.

In the following a broad spectrum of different suitable benzoxazines containing one to four benzoxazine moieties are presented.

One possible benzoxazine may be embraced by the following structure I:

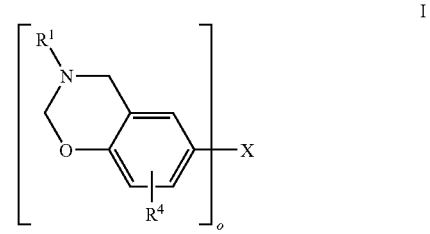

where o is 1-4, X is selected from a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R^1$ is selected from hydrogen, alkyl, alkenyl and aryl, and $R^4$ is selected from hydrogen, halogen, alkyl and alkenyl, or $R^4$ is a divalent residue creating a naphthoxazine residue out of the benzoxazine structure.

More specifically, within structure I the benzoxazine may be embraced by the following structure II:

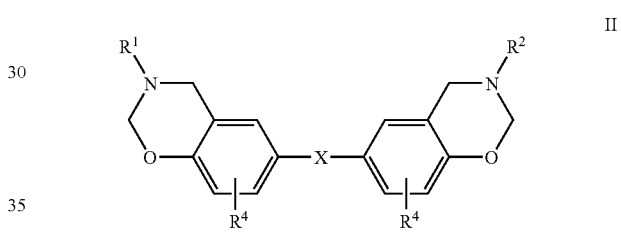

where X is selected from a direct bond, $CH_2$, $C(CH_3)_2$, C=O, S, S=O and O=S=O, $R^1$ and $R^2$ are the same or different and are selected from hydrogen, alkyl, such as methyl, ethyl, propyls and butyls, alkenyl, such as allyl, and aryl, and $R^4$ are the same or different and defined as above. Preferably X is selected from a direct bond and/or C=O.

Representative benzoxazines within structure II further include:

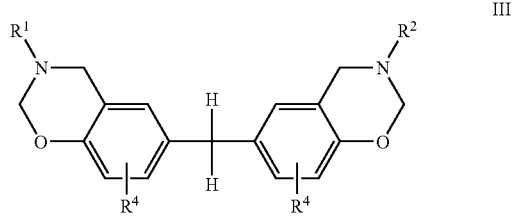

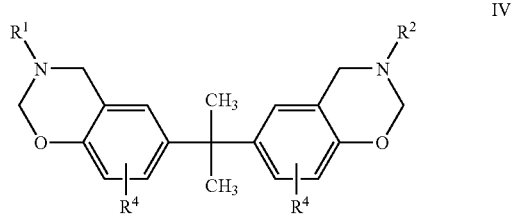

where $R^1$, $R^2$ and $R^4$ are as defined above.

Alternatively, the benzoxazine may be embraced by the following structure V:

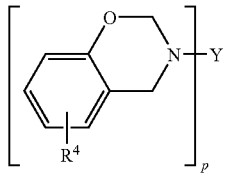

V where p is 2, Y is selected from biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R^4$ is selected from hydrogen, halogen, alkyl and alkenyl, or $R^4$ is a divalent residue creating a naphthoxazine residue out of the benzoxazine structure.

Though not embraced by structures I or V additional benzoxazines are within the following structures:

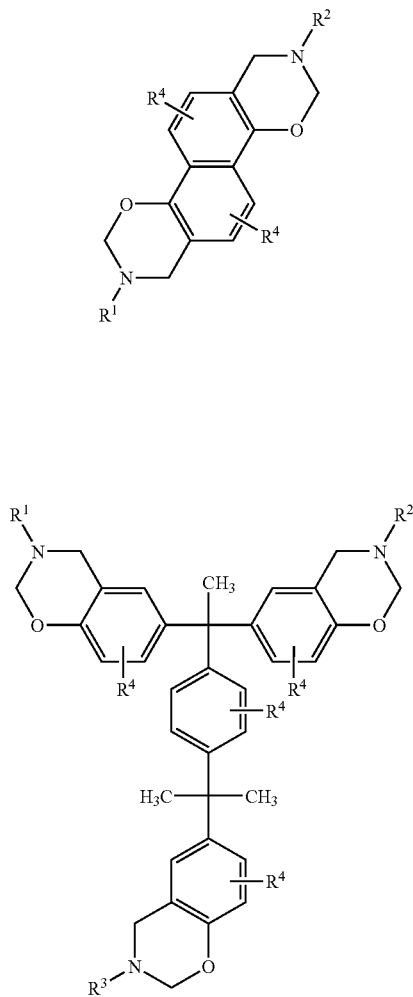

VI

VII

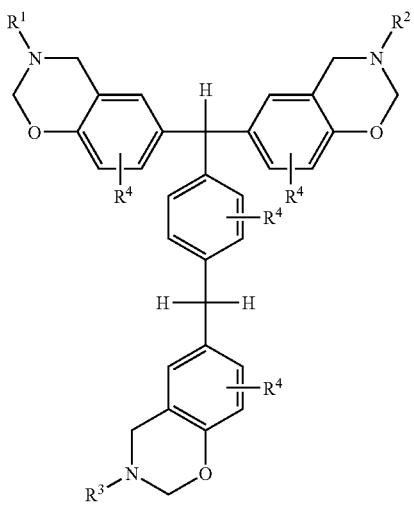

VIII where $R^1$, $R^2$ and $R^4$ are as defined above, and $R^3$ is defined as $R^1$, $R^2$ or $R^4$.

Specific examples of the above generically described benzoxazines include:

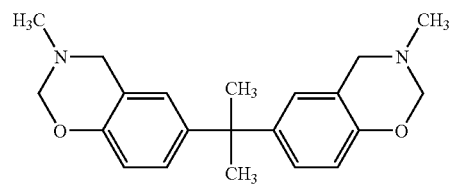

IX

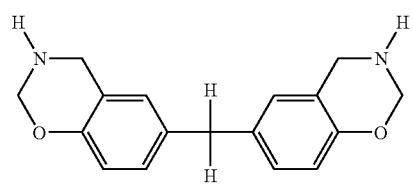

X

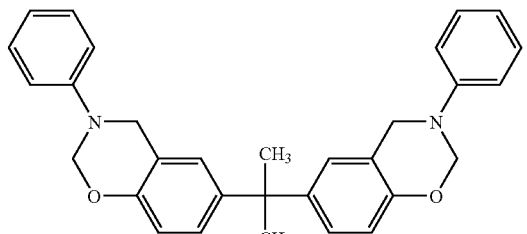

XI

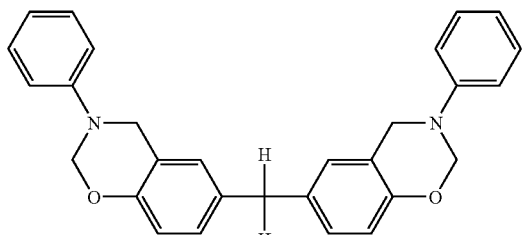

XII

-continued

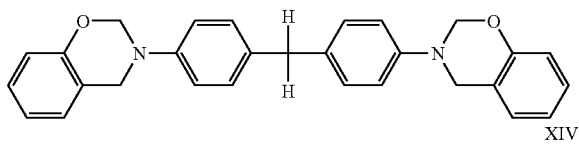

XIII

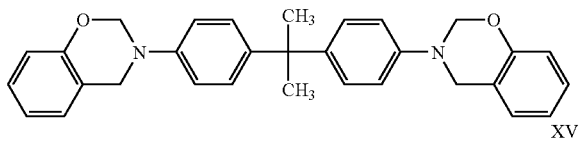

XIV

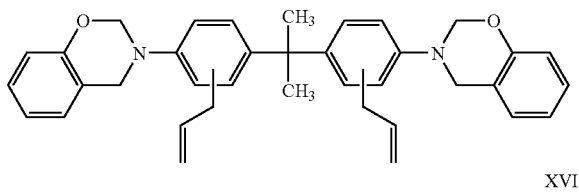

XV

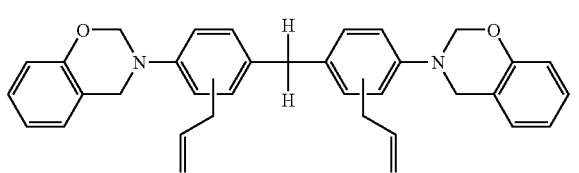

XVI

The further benzoxazine component may include the combination of multifunctional benzoxazines and monofunctional benzoxazines, or may be the combination of one or more multifunctional benzoxazines or one or more monofunctional benzoxazines.

Examples of monofunctional benzoxazines may be embraced by the following structure XVII:

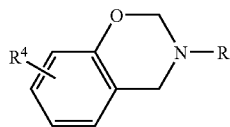

XVII where R is alkyl, such as methyl, ethyl, propyls and butyls, or aryl with or without substitution on one, some or all of the available substitutable sites, and $R^4$ is selected from hydrogen, halogen, alkyl and alkenyl, or $R^4$ is a divalent residue creating a naphthoxazine residue out of the benzoxazine structure.

For instance, monofunctional benzoxazines may be embraced by general structure XVIII:

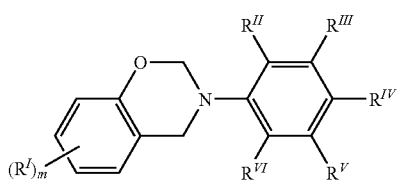

XVIII where in this case $R^1$ is selected from alkyl, alkenyl, each of which being optionally substituted or interrupted by one or more O, N, S, C=O, COO, and NHC=O, and aryl; m is 0 to 4; and $R^{II}$, $R^{III}$, $R^{IV}$, $R^V$ and $R^{VI}$ are independently selected from hydrogen, alkyl, alkenyl, each of which being optionally substituted or interrupted by one or more O, N, S, C=O, COOH, and NHC=O, and aryl.

Specific examples of such a monofunctional benzoxazine are:

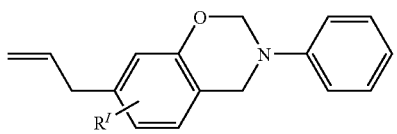

XIX where $R^1$ is as defined above; or

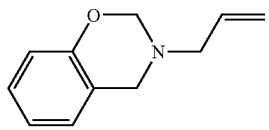

XXII

Benzoxazines are presently available commercially from several sources, including Huntsman Advanced Materials; Georgia-Pacific Resins, Inc.; and Shikoku Chemicals Corporation, Chiba, Japan.

If desired, however, instead of using commercially available sources, the benzoxazine may typically be prepared by reacting a phenolic compound, such as a bisphenol A, bisphenol F, bisphenol S or thiodiphenol, with an aldehyde and an alkyl or aryl amine. U.S. Pat. No. 5,543,516, hereby expressly incorporated herein by reference, describes a method of forming benzoxazines, where the reaction time can vary from a few minutes to a few hours, depending on reactant concentration, reactivity and temperature. See e.g. U.S. Pat. Nos. 4,607,091 (Schreiber), 5,021,484 (Schreiber), 5,200,452 (Schreiber) and 5,443,911 (Schreiber).

Further curable ingredients other than the curable benzoxazine macromonomers of the present invention or other benzoxazine-based ingredients are for example epoxy resins, phenol resins, maleinimide resins, oxazolines, isocyanates and the like.

Curing of the curable formulations of the present invention to the cured products of the present invention can be self-initiated under elevated temperature conditions and also by inclusion of cationic initiators, such as Lewis acids, and other known cationic initiators, such as metal halides; organometallic derivatives; metallophorphyrin compounds such as aluminum phthalocyanine chloride; methyl tosylate, methyl triflate, and triflic acid; and oxyhalides. Likewise, basic materials, such as imidizaoles, may be used to initiate polymerization. A typical curing temperature without catalyst will be in the range of 150 to 250° C., more preferably in the range of 160 to 220° C. In catalyst containing formulations the curing temperatures can be lowered depending on the catalyst chosen.

For the evaluation of toughening properties of the curable benzoxazine macromonomers of the present invention in resinous formulations, the critical fracture toughness parameters to be determined are the critical stress intensity factor (K1c) and the critical energy release rate (G1c).

The cured products of the present invention obtained from the curable compositions of the present invention preferably exhibit a flexural modulus of about 1000 to about 5000 MPa, a flexural strength of about 50 to about 200 MPa, a glass transition temperature of about 120 to about 300° C., a critical stress intensity factor (K1c) of about 0.5 to about 4.0 MPa/m$^2$, a critical energy release rate (G1c) of about 100 to about 600 J/m$^2$ and an elongation of about 0.7 to about 10%.

Most preferably the cured product according to the present invention exhibits a flexural modulus of at least about 2500 MPa, a flexural strength of at least about 70 MPa, a glass transition temperature of at least about 140° C., a critical stress intensity factor (K1c) of at least about 0.9 MPa/m$^2$, a critical energy release rate (G1c) of at least about 180 J/m$^2$ and an elongation of at least about 2.5%.

EXAMPLES

A. Synthesis of Curable Benzoxazine Macromonomers (CBM)

A.1 Synthesis of TBox #1
Versalink P-1000 (100%), Resulting in about 84% to 86%% Soft Fragments Content In a 2 L standard apparatus consisting of a three-necked round bottom flask equipped with stirrer, condenser, electric thermometer, dropping funnel and nitrogen gas inlet a cloggy mixture of 20.81 g (0.693 mol; 0.693 eq) paraformaldehyde and 8.03 g (0.099 mol; 0.099 eq) formaldehyde solution (37% in water) in 100 ml toluene was cooled with ice. Under a nitrogen gas atmosphere 232.56 g (0.180 mol; 0.360 eq) Versalink P-1000 solution in 200 ml toluene was added dropwise within 20 minutes at 3.4-7.3° C., resulting in a hazy solution. A solution of 41.09 g (0.180 mol; 0.360 eq) bisphenol A in 100 ml ethyl acetate was added within 5 minutes at 7.0-8.4° C. The hazy reaction mixture was subsequently heated and maintained under reflux conditions for 6 hours while stirring. After the initial heating had been completed, 3×100 ml of toluene were added to the mixture. While the reaction was progressing, the accumulating water was removed by distillation using a water separator. The volume of water obtained was 7.1 ml after 1 hour, 13 ml after 3 hours, and 13 ml after 6 hours, corresponding to 75% of the theoretically formed volume of 17.2 ml of water.

The clear solution resulting from the above reaction was washed three times with a solution of NaHCO$_3$ (1N) and three times with 10% ethanol in water. All phase separations took place very slowly. The organic phase was then dried over sodium sulfate and concentrated using a rotary evaporator. Remaining solvents were removed in a vacuum drying cabinet.

282 g of product were obtained, corresponding to 100% of the theoretical yield (282.3 g).

A.2 Synthesis of TBox #2
Versalink P-1000 and Jeffamin D2000 (87.5:12.5), Resulting in about 81% to 85% Soft Fragments Content In a 2 L standard apparatus a cloggy mixture of 17.95 g (0.5679 mol; 0.5679 eq) paraformaldehyde and 6.58 g (0.0811 mmol; 0.0811 eq) formaldehyde solution (37% in water) in 120 ml toluene was cooled with ice. Under nitrogen gas atmosphere 175.00 g (0.1354 mol; 0.2708 eq) Versalink P-1000 solution in 270 ml toluene was added dropwise within 20 minutes at 3.4-6.6° C., resulting in a milky, hazy solution. A solution of 25.00 g (0.0121 mol; 0.0242 eq) Jeffamine D2000 in 70 ml toluene was added dropwise within 7 minutes at 5.3-6.0° C. A solution of 33.67 g (0.1475 mol; 0.2950 eq) bisphenol A in 100 ml ethyl acetate was added within 5 minutes at 5.5-8.2° C. The milky, hazy reaction mixture was then heated and maintained under reflux conditions. After 1 hour, the mixture was getting viscous, and 200 ml of toluene were added. While the reaction was progressing, the accumulating water was removed using a water separator. The volume of water obtained was 8.5 ml after 1 hour, 10 ml after 2 hours, 10.2 ml after 3 hours, and 10.2 ml after 6 hours, corresponding to 72% of the theoretically formed volume of 14.1 ml of water. The reaction was terminated after 6 hours. While cooling down, the product was diluted again with toluene.

The solution resulting from above reaction was washed three times with a solution of NaHCO$_3$ (1N) and three times with 10% ethanol in water. The organic phase was then dried over sodium sulfate, and concentrated using a rotary evaporator. Remaining solvents were removed in a vacuum drying cabinet at 50° C.

220 g of product (yellow, viscous) were obtained, corresponding to 91% of the theoretical yield (240.7 g).

A.2.1 Synthesis of TBox #2.1
Versalink P-1000 and Jeffamin D2000 (87.5:12.5) Using an Increased Amount of Bisphenol A, Resulting in about 81% to 85% Soft Fragments Content In a 4 L standard apparatus, consisting of a three-necked round bottom flask equipped with stirrer, condenser, electric thermometer and dropping funnel 62.03 g (1.9831 mol) of paraformaldehyde and 123.47 g (0.5408 mol) of Bisphenol A were weighted in as starting materials. After the addition of 200 ml of toluene and 2 min stirring at room temperature a cloggy suspension was observed. A solution of 75 g (0.0367 mol) Jeffamine D-2000 in 100 ml toluene was added without cooling within two minutes. A low temperature rise from 19.9° C. to 21.9° C. was observed. Afterwards a solution of 525 g (0.4240 mol) Versalink P-1000 in 550 ml toluene was added within 12 minutes without cooling. The temperature stayed below 25° C. during the addition. The cloggy reaction mixture was further diluted with 150 ml of toluene and then heated. At 85° C. the reaction mixture was becoming viscous and was further diluted with 500 ml of toluene. Afterwards the reaction mixture was heated to reflux conditions for 6 hours.

The solution resulting from above reaction was washed three times with deionized water. The organic phase was then concentrated using a rotary evaporator. The majority of the remaining solvents were removed at 85° C. under reduced pressure (ca. 1 mbar) and stirring for 2 hours. 1091.3 g of product (yellow, viscous) were obtained.

A.2.2 Synthesis of TBox #2.4
Versalink P-1000 and Jeffamin D2000 (87.5:12.5), Resulting in about 81% to 85% Soft Fragments Content In a 1 L three-necked round bottom flask equipped with stirrer, condenser, electric thermometer and dropping funnel 8.13 g (0.2598 mol) of paraformaldehyde and 12.65 g (0.0590 mol) of 4,4"-dihydroxybenzophenon were weighted in as starting materials. After the addition of 50 ml of toluene and 2 min stirring at room temperature a cloggy suspension was observed. Now a solution of 10 g (0.0049 mol) Jeffamine D-2000 in 40 ml toluene was added without cooling within two minutes. Afterwards a solution of 70 g (0.0542 mol) Versalink P-1000 in 180 ml toluene was added within three minutes without cooling. The temperature stayed below 25° C. during the addition. The cloggy reaction mixture was then heated and became viscous under reflux conditions. Therefore additional 300 ml of toluene were added. The reaction mixture was heated to and maintained at reflux conditions for 6 hours.

The solution resulting from above reaction was washed three times with deionized water, the phase separation was slow. The organic phase was then concentrated using a rotary evaporator. The remaining solvents were removed at 85° C.

A.3 Synthesis of TBox #3

Versalink P-1000 and Jeffamin D2000 (75:25), Resulting in about 82% to 86% Soft Fragment Content In a 2 L standard apparatus a doggy mixture of 25.62 g (0.8104 mol; 0.8104 eq) paraformaldehyde (95%) and 9.40 g (0.1158 mol; 0.1158 eq) formaldehyde solution (37% in water) in 100 ml toluene was cooled with ice. Under nitrogen gas atmosphere 75.00 g (0.0364 mol; 0.0728 eq) Jeffamin D2000 solution in 100 ml toluene was added dropwise within 5 minutes at 3.6-8.0° C., resulting in a milky, hazy solution. The solution of 225.00 g (0.1741 mol; 0.3482 eq) Versalink P-1000 in 300 ml toluene was added dropwise within 10 minutes at 3.7-7.6° C. The solution of 48.07 g (0.2105 mol; 0.4210 eq) bisphenol A in 120 ml ethyl acetate was added within 7 minutes at 6.4-8.4° C. The milky, hazy reaction mixture was then heated and maintained under reflux conditions. While the reaction was progressing, the accumulating water was removed using a water separator. The volume of water obtained was 6.5 ml after 1 hour, 11 ml after 4 hours, and 13 ml after 6 hours, corresponding to 65% of the theoretically formed volume of 20 ml of water. The reaction was terminated after 6 hours. While cooling down, the product was diluted again with toluene.

The clear solution resulting from above reaction was washed three times with a warm solution of $NaHCO_3$/NaCl (containing 4 parts 1N $NaHCO_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. Remaining solvents were removed in a vacuum drying cabinet at 50° C.

345.8 g of product (yellow, viscous) were obtained, corresponding to 96.5% of the theoretical yield (358.2 g).

A.3.1 Synthesis of TBox #3.1

Versalink P-1000 and Jeffamin D2000 (75:25) Using an Increased Amount of Bisphenol A, Resulting in about 81% to 85% Soft Fragments Content In a 4 L standard apparatus 70.14 g (2.2422 mol) of paraformaldehyde and 139.60 g (0.6115 mol) of Bisphenol A were weighted in as starting materials. After the addition of 300 ml of toluene and 2 min stirring at room temperature a cloggy suspension was observed. Now a solution of 175 g (0.0856 mol) Jeffamine D-2000 in 100 ml toluene was added without cooling within three minutes. A low temperature rise from 21.3° C. to 25.2° C. was observed. Afterwards a solution of 525 g (0.4240 mol) Versalink P-1000 in 300 ml toluene was added within 15 minutes without cooling. The temperature stayed below 26° C. during the addition. The cloggy reaction mixture was further diluted with 300 ml of toluene and then heated. At 88° C. the reaction mixture was becoming viscous and was further diluted with 200 ml of toluene. Afterwards the reaction mixture was heated to reflux conditions for 6 hours. The solution resulting from above reaction was washed three times with deionized water, the phase separation was slow. The organic phase was then concentrated using a rotary evaporator. The majority of the remaining solvents were removed at 85° C. under reduced pressure (ca. 1 mbar) and stirring for 2 hours. 1187.9 g of product (yellow, viscous) were obtained.

under reduced pressure (ca. 1 mbar) and stirring for 2 hours and a yellow, viscous polymer was obtained.

A.4 Synthesis of TBox #4

Versalink P-1000 and Jeffamin D2000 (62.5:37.5), Resulting in about 82% to 86% Soft Fragment Content In a 2 L standard apparatus a cloggy mixture of 16.20 g (0.5124 mol; 0.5124 eq) paraformaldehyde (95%) and 5.94 g (0.0732 mol; 0.0732 eq) formaldehyde solution (37% in water) in 100 ml toluene was cooled with ice. Under nitrogen gas atmosphere 125.00 g (0.0967 mol; 0.1934 eq) Versalink P-1000 solution in 250 ml toluene was added dropwise within 20 minutes at 5.7-8.2° C., resulting in a milky, hazy solution. A solution of 75.00 g (0.0364 mol; 0.0728 eq) Jeffamin D2000 in 100 ml toluene was added dropwise within 7 minutes at 5.0-6.7° C. A solution of 30.38 g (0.1331 mol; 0.2662 eq) bisphenol A in 100 ml ethyl acetate was added within 5 minutes at 6.3-6.9° C. The milky, hazy reaction mixture was then heated and maintained under reflux conditions. While the reaction was progressing, the accumulating water was removed using a water separator. The volume of water obtained was 6.5 ml after 1 hour, 7.6 ml after 2 hours, 8.2 ml after 3 hours, 8.5 ml after 4 hours, and 8.6 ml after 6 hours, corresponding to 68% of the theoretically formed volume of 12.7 ml of water. The reaction was terminated after 6 hours. While cooling down, the product was diluted again with toluene. The clear solution resulting from above reaction was washed three times with a warm solution of $NaHCO_3$/NaCl (containing 4 parts 1N $NaHCO_3$ in water and 1 part saturated NaCl solution in water), and three times with a ethanol/NaCl solution (containing 4 parts aqueous ethanol (10% ethanol) and 1 part saturated NaCl solution in water). The organic phase was then dried over sodium sulfate, and concentrated using a rotary evaporator. Remaining solvents were removed in a vacuum drying cabinet at 50° C.

231.5 g of product (yellow, viscous) were obtained, corresponding to 97.8% of the theoretical yield (236.7 g).

A.5 Synthesis of TBox #5

Versalink P-1000 and Jeffamin D2000 (50:50), Resulting in about 83% to 87% Soft Fragment Content In a 2 L standard apparatus a cloggy mixture of 16.87 g (0.5336 mol; 0.5336 eq) paraformaldehyde (95%) and 6.18 g (0.0762 mol; 0.0762 eq) formaldehyde solution (37% in water) in 100 ml toluene was cooled with ice. Under nitrogen gas atmosphere a solution of 110.00 g (0.0535 mol; 0.1070 eq) Jeffamin D2000 in 130 ml toluene was added dropwise within 15 minutes at 4.7-9.8° C., resulting in a milky, hazy solution. A solution of 110.00 g (0.0851 mol; 0.1702 eq) Versalink P-1000 in 250 ml toluene was added dropwise within 15 minutes at 3.2-5.4° C. A solution of 31.64 g (0.1386 mol; 0.2772 eq) bisphenol A in 120 ml ethyl acetate was added within 5 minutes at 4.5-6.0° C. The milky, hazy reaction mixture was then heated and maintained under reflux conditions, while the mixture was slowly getting clear. While the reaction was progressing, the accumulating water was removed using a water separator. The volume of water obtained was 5.5 ml after 2 hours, and 6.5 ml after 6 hours, corresponding to 49% of the theoretically formed volume of 13.2 ml of water. The reaction was terminated after 6 hours.

The clear solution resulting from above reaction was washed three times with a warm solution of $NaHCO_3$/NaCl (containing 4 parts 1N $NaHCO_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. Remaining solvents were removed in a vacuum drying cabinet at 50° C.

242.4 g of product (yellow, viscous) were obtained, corresponding to 93.8% of the theoretical yield (258.3 g).

A.6 Synthesis of TBox #6
Versalink P-1000 and Jeffamin D2000 (25:75), Resulting in about 85% to 89% Soft Fragment Content In a 2 L standard apparatus a cloggy solution of 31.0 g (0.9806 mol) paraformaldehyde (95%) in 100 ml toluene was cooled with ice. Under nitrogen gas atmosphere 300.00 g (0.1455 mol; 0.65 eq) Jeffamin D2000 solution in 350 ml toluene was added slowly. Then, a solution of 100.00 g (0.0774 mol; 0.35 eq) Versalink P-1000 in 150 ml toluene and a solution of 50.88 g (0.2229 mol; 1 eq) bisphenol A in 120 ml ethyl acetate were added likewise. The milky, hazy reaction mixture was then heated and maintained under reflux conditions. While the reaction was progressing, the reaction mixture was getting clear slowly, and the accumulating water was removed using a water separator. The reaction was terminated after 6 hours.

The clear solution resulting from above reaction was washed three times with a warm solution of $NaHCO_3$/NaCl (containing 4 parts 1N $NaHCO_3$ in water and 1 part saturated NaCl solution in water), and three times with a ethanol/NaCl solution (containing 4 parts aqueous ethanol (10% ethanol) and 1 part saturated NaCl solution in water).

The phase separations took place slowly. The organic phase was then dried over sodium sulfate, and concentrated using a rotary evaporator. Remaining solvents were removed in a vacuum drying cabinet at 50° C.

437.12 g of product (yellow, viscous) were obtained, corresponding to 94.7% of the theoretical yield (461.60 g).

A.7 Synthesis of TBox #7
Jeffamin D2000 (100%), Resulting in about 85% to 89% Soft Fragment Content In a 2 L standard apparatus a cloggy mixture of 22.95 g (0.726 mol) paraformaldehyde (95%) and 100 ml toluene was cooled with ice. Under nitrogen gas atmosphere a solution of 339.24 g (0.165 mol; 1 eq) Jeffamin D2000 in 300 ml toluene was added dropwise and slowly at max. 10° C. A solution of 37.66 g (0.165 mol; 1 eq) bisphenol A in 120 ml ethyl acetate was added likewise. The milky, hazy reaction mixture was then heated and maintained under reflux conditions, while the mixture was slowly getting clear. While the reaction was progressing, the accumulating water was removed using a water separator. The reaction was terminated after 6 hours.

The clear solution resulting from above reaction was washed three times with a warm solution of $NaHCO_3$,NaCl (containing 4 parts 1N $NaHCO_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. Remaining solvents were removed in a vacuum drying cabinet at 50° C.

381.44 g of product (yellow, viscous) were obtained, corresponding to 96.15% of the theoretical yield (384.84 g).

A.8 Synthesis of TBox #8
Versalink P-1000 and PDMS NH 15 (95:5), Resulting in about 80% to 84% Soft Fragment Content In a 2 L standard apparatus a doggy mixture of 18.87 g (0.5971 mol; 0.5971 eq) paraformaldehyde (95%) and 6.92 g (0.0853 mol; 0.0853 eq) formaldehyde solution (37% in water) in 100 ml toluene was cooled with ice. Under nitrogen gas atmosphere a solution of 10.00 g (0.0081 mol; 0.0162 eq) PDMS NH 15 in 40 ml toluene was added within 5 minutes at 3.9-5.5° C. A solution of 190.00 g (0.1470 mol; 0.2940 eq) Versalink P-1000 in 270 ml toluene was added dropwise within 20 minutes at 3.5-7.4° C. A solution of 35.41 g (0.1551 mol; 0.3102 eq) bisphenol A in 100 ml ethyl acetate was added within 7 minutes at 6.1-8.1° C. The milky, hazy reaction mixture was then heated and maintained under reflux conditions. After 30 minutes, 200 ml toluene were added. After 1 hour, 100 ml toluene were added. While the reaction was progressing, the accumulating water was removed using a water separator. The volume of water obtained was 6.5 ml after 1 hour, 8 ml after 2 hours, 10 ml after 3 hours, and 10 ml after 6 hours, corresponding to 68% of the theoretically formed volume of 14.7 ml of water. The reaction was terminated after 6 hours.

The slightly hazy solution resulting from above reaction was washed three times with a warm solution of $NaHCO_3$/NaCl (containing 4 parts 1N $NaHCO_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. While remaining solvents were removed in a vacuum drying cabinet at 45-50° C., the product foamed over.

231.24 g of product (yellow, viscous) were obtained, corresponding to 95.8% of the theoretical yield (241.5 g).

A.9 Synthesis of TBox #9
Versalink P-1000 and PDMS NH 40 (95:5), Resulting in about 81% to 85% Soft Fragment Content In a 2 L standard apparatus a cloggy mixture of 18.28 g (0.5782 mol; 0.5782 eq) paraformaldehyde (95%) and 6.70 g (0.0826 mol; 0.0826 eq) formaldehyde solution (37% in water) in 100 ml toluene was cooled with ice. Under nitrogen gas atmosphere, a solution of 10.00 g (0.0032 mol; 0.0064 eq) PDMS NH40D in 40 ml toluene was added within 4 minutes at 4.2-6.4° C. A solution of 190.00 g (0.1470 mol; 0.2940 eq) Versalink P-1000 in 250 ml toluene was then added dropwise within 20 minutes at 5.3-8.3° C. A solution of 34.29 g (0.1502 mol; 0.6008 eq) bisphenol A in 100 ml ethyl acetate was added within 10 minutes at 5.8-6.8° C. The milky, hazy reaction mixture was then heated and maintained under reflux conditions. After 30 minutes, 100 ml toluene were added. While the reaction was progressing, the accumulating water was removed using a water separator. The volume of water obtained was 1.7 ml after 1 hour, 3 ml after 2 hours, 5 ml after 3 hours, and 6 ml after 6 hours, corresponding to 41.9% of the theoretically formed volume of 14.3 ml of water. The reaction was terminated after 6 hours.

The slightly hazy solution resulting from above reaction was washed three times with a warm solution of $NaHCO_3$/NaCl (containing 4 parts 1N $NaHCO_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. Remaining solvents were removed in a vacuum drying cabinet at 45° C.

235.5 g of product (yellow, viscous) were obtained, corresponding to 97.5% of the theoretical yield (241.5 g).

A.10 Synthesis of TBox #10
Versalink P-1000 and PDMS NH 40 (90:10), Resulting in about 82% to 86% Soft Fragment Content In a 2 L standard apparatus a cloggy mixture of 17.74 g (0.5613 mol; 0.5613 eq) paraformaldehyde (95%) and 6.51 g (0.0802 mol; 0.0802 eq) formaldehyde solution (37% in water) in 100 ml toluene was cooled with ice. Under nitrogen gas atmosphere, a solution of 20.00 g (0.0065 mol; 0.0130 eq) PDMS NH40D in 20 ml toluene was added within 2 minutes at 2.7-5.3° C. A solution of 180.00 g (0.1393 mol; 0.2786 eq)

Versalink P-1000 in 250 ml toluene was then added dropwise at 5.0-8.7° C. Due to the relatively high concentration of the Versalink solution, the reaction mixture started to get viscous after some milliliters of the Versalink solution had been added. Therefore, 100 ml of toluene were added to the reaction mixture, and the rest of the Versalink solution was also diluted with toluene. A solution of 33.28 g (0.1458 mol; 0.2916 eq) bisphenol A in 100 ml ethyl acetate was added within 10 minutes at 4.1-4.4° C. The milky, hazy reaction mixture was then heated and maintained under reflux conditions, while the mixture was slowly becoming a clear solution. After 2 hours, 200 ml of toluene were added. While the reaction was progressing, the accumulating water was removed using a water separator. The volume of water obtained was 3 ml after 1 hour, 5.8 ml after 2 hours, and 9.7 ml after 6 hours, corresponding to 69.8% of the theoretically formed volume of 13.9 ml of water. The reaction was terminated after 6 hours.

The slightly hazy solution resulting from above reaction was washed three times with a warm solution of NaHCO$_3$/NaCl (containing 4 parts 1N NaHCO$_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. Remaining solvents were removed in a vacuum drying cabinet at 45° C.

238.7 g of product (yellow, viscous) were obtained, corresponding to 99.7% of the theoretical yield (239.2 g).

A.11 Synthesis of TBox #11

Versalink P-1000 and A Bisphenol A-Functionalized PU Prepolymer (90:10), Resulting in 84.34% Soft Fragment Content The synthesis was performed in two steps.

Step 1: Synthesis of Bisphenol A-Functionalized PU Prepolymer

In the first step, a PU prepolymer was synthesized from polybutadiene (Krasol LBH 2000) and TDI (toluene diisocyanate). The end groups were functionalized with bisphenol A for the subsequent use of the bisphenol A-functionalized PU prepolymer as a soft fragment of TBox #11.

210 g (0.1 mol) of polybutadiene diol (Krasol LBH 2000; M=2100 g/mol) was desiccated for 30 minutes at 90° C. using a vacuum oil pump. Under a nitrogen gas atmosphere, 34.8 g (0.2 mol) toluene diisocyanate (TDI) was added at 73° C. The mixture was stirred for 30 minutes at 75° C. under a nitrogen gas atmosphere. To complete the reaction of the excess isocyanate groups, 45.8 g (0.2 mol) of bisphenol A and about 30 mg dibutyltin dilaurate (DBTL) were added at 75° C., and the mixture was stirred for 1.5 hours at 90° C. Then, 50 g of ethyl acetate were added, and the mixture is again stirred for 1.5 hours at 90° C. The progress of the reaction was monitored by determining the NCO content. The final product does not contain any free OH groups.

In order to prepare Step 2, the hydroxyl number of the product was determined (OH number=39) to obtain the molecular weight (2776 g/mol). The product was diluted with toluene to yield a 55% (w/w) solution.

Step 2: Synthesis of TBox #11

In a 2 L standard apparatus 33.91 g (1.0727 mol) paraformaldehyde (95%) in 100 ml toluene was cooled with ice. Under a nitrogen gas atmosphere, a solution of 315.00 g (0.2438 mol; 0.4876 eq) Versalink P-1000 in 250 ml toluene was added dropwise within 15 minutes at 2.1-9.8° C. A solution of 63.64 g (0.0126 mol; 0.0252 eq) bisphenol A-functionalized PU prepolymer (55% w/w in toluene) in 50 ml toluene was added dropwise within 5 minutes at 6.0-6.5° C. A solution of 52.78 g (0.2312 mol; 0.4624 eq) bisphenol A in 110 ml ethyl acetate was added within 7 minutes at 5.8-7.8° C. The milky, hazy reaction mixture was then heated and maintained under reflux conditions. Since the mixture was becoming highly viscous, 600 ml of toluene were added. While the reaction was progressing, the accumulating water was removed using a water separator. The volume of water obtained was 15 ml after 6 hours. The reaction was terminated after 6 hours.

The solution resulting from above reaction was washed three times with a warm solution of NaHCO$_3$/NaCl (containing 4 parts 1N NaHCO$_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. Remaining solvents were removed in a vacuum drying cabinet at 50° C., while the product was placed on a foil.

396.78 g of product were obtained, corresponding to 95.6% of the theoretical yield (415.05 g).

A.12 Synthesis of TBox #12

Versalink P-1000 and A Bisphenol A-Functionalized PU Prepolymer (70:30), Resulting in about 87% to 91% Soft Fragment Content The synthesis was performed in two steps.

Step 1: see A.11—Synthesis of TBox #11

Step 2: Synthesis of TBox #12

In a 2 L standard apparatus 26.37 g (0.8342 mol) paraformaldehyde (95%) in 100 ml toluene was cooled with ice. Under a nitrogen gas atmosphere, a solution of 245.00 g (0.1896 mol; 0.3792 eq) Versalink P-1000 in 250 ml toluene was added dropwise within 15 minutes at 6.6-9.1° C. 190.90 g (0.0378 mol; 0.0756 eq) of a solution of bisphenol A-functionalized PU prepolymer (55% w/w in toluene) in 100 ml toluene was added dropwise within 7 minutes at 6.8-7.9° C. A solution of 34.66 g (0.1518 mol; 0.3036 eq) bisphenol A in 70 ml ethyl acetate was added within 7 minutes at 6.8-8.6° C. The milky, hazy reaction mixture was then heated and maintained under reflux conditions. Since the mixture was becoming highly viscous, 500 ml of toluene were added. While the reaction was progressing, the accumulating water was removed using a water separator. The volume of water obtained was 13 ml after 6 hours. The reaction was terminated after 6 hours.

The solution resulting from above reaction was washed three times with a warm solution of NaHCO$_3$/NaCl (containing 4 parts 1N NaHCO$_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. Remaining solvents were removed in a vacuum drying cabinet at 50° C., while the product was placed on a foil.

359.5 g of product were obtained, corresponding to 91.3% of the theoretical yield (393.71 g).

A.13 Synthesis of TBox #13

Jeffamin D2000 and A Bisphenol A-Functionalized PU Prepolymer (70:30), Resulting in about 92% to 96% Soft Fragment Content The synthesis was performed in two steps.

Step 1: see A.11—Synthesis of TBox #11

Step 2: Synthesis of TBox #13

In a 2 L standard apparatus 16.58 g (0.5245 mol; 0.5245 eq) paraformaldehyde (95%) in 100 ml toluene was cooled with ice. Under nitrogen atmosphere, a solution of 245.00 g (0.1192 mol; 0.2384 eq) Jeffamin D2000 in 150 ml toluene was added dropwise within 7 minutes at 2.8-7.1° C., resulting in a hazy solution. A solution of 190.90 g (0.0378 mol; 0.0756 eq) bisphenol A-functionalized PU prepolymer (55% w/w in toluene) in 50 ml toluene was added dropwise within 10 minutes at 3.6-6.3° C. A solution of 18.58 g (0.0814 mol; 0.1628 eq) bisphenol A in 100 ml ethyl acetate was added within 3 minutes at 5.8-7.9° C. The milky, hazy reaction mixture was then heated and maintained under reflux conditions, while the mixture was slowly getting clear. While the reaction was progressing, the accumulating water was removed using a water separator. The reaction was terminated after 6 hours.

The clear solution resulting from above reaction was washed three times with a warm solution of $NaHCO_3$/NaCl (containing 4 parts 1N $NaHCO_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. Remaining solvents were removed in a vacuum drying cabinet at 50° C.

358.6 g of product (yellow, viscous) were obtained, corresponding to 95.8% of the theoretical yield (374.3 g).

Synthesis of TBox with Branched Structure

A14. Synthesis of TBox #14

Jeffamin D2000, Jeffamin T3000, and Versalink P-1000 (20:5:75) with Bisphenol A, Resulting in about 82% to 86% Soft Fragment Content In a 2 L standard apparatus a cloggy mixture of 17.14 g (0.5422 mol; 0.5422 eq) paraformaldehyde (95%) and 6.29 g (0.0775 mol) formaldehyde solution (37% in water) in 100 ml toluene was cooled with ice. Under a nitrogen gas atmosphere, a solution of 10.00 g (0.0035 mol; 0.0106 eq) Jeffamin T3000 in 50 ml toluene was added dropwise within 5 minutes at 2.6-4.1° C. A solution of 40.00 g (0.0194 mol; 0.0389 eq) Jeffamin D2000 in 50 ml toluene was added dropwise within 5 minutes at 3.5-7.9° C. A solution of 150.00 g (0.1161 mol; 0.2322 eq) Versalink P-1000 in 240 ml toluene was added dropwise within 10 minutes at 6.4-9.2° C. A solution of 32.15 g (0.1408 mol; 0.2817 eq) bisphenol A in 120 ml ethyl acetate was added within 10 minutes at 7.6-8.8° C. The milky, hazy reaction mixture was then heated and maintained under reflux conditions. The mixture was becoming viscous after 0.5 hour, and 200 ml of toluene were added. The mixture was becoming highly viscous after 1 hour, and 300 ml of toluene were added. While the reaction was progressing, the accumulating water was removed using a water separator. The volume of water obtained was 7.5 ml after 0.5 hour, 9.5 ml after 1 hour, and 10 ml after 6 hours, corresponding to 74% of the theoretically formed volume of 13.5 ml of water. The reaction was terminated after 6 hours. While cooling down, the product was diluted with toluene.

The clear solution resulting from above reaction was washed three times with a warm solution of $NaHCO_3$/NaCl (containing 4 parts 1N $NaHCO_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. Remaining solvents were removed in a vacuum drying cabinet at 50° C.

235 g of product (yellow, viscous) were obtained, corresponding to 98.4% of the theoretical yield (238.9 g).

A.14.1 Synthesis of TBox #14.1

Versalink P-1000, Jeffamin D2000 and Jeffamine T3000 (Soft Segment Ratio 87.5:11.5:1), Resulting in about 81% to 85% Soft Fragments Content In a 2 L three-necked round bottom flask equipped with stirrer, condenser, electric thermometer and dropping funnel 21.08 g (0.6741 mol) of paraformaldehyde and 34.98 g (0.1532 mol) of Bisphenol A were weighted in as starting materials. After the addition of 50 ml of toluene and 2 min stirring at room temperature a cloggy suspension was observed. Now a solution of 2.0 g (0.0007 mol) Jeffamine T-3000 in 50 ml toluene was added without cooling within 1 min at room temperature. Afterwards a solution of 23.00 g (0.0112 mol) Jeffamine D-2000 in 100 ml toluene was added without cooling within two minutes. Afterwards a solution of 175.0 g (0.1413 mol) Versalink P-1000 in 220 ml Ethylacetate was added within 5 minutes without cooling. The temperature stayed below 26° C. during the addition of all the different amine solutions. The cloggy reaction mixture was afterwards heated to reflux conditions. At this stage additional 300 ml of toluene were added. Then the reflux was maintained for 6 hours.

The solution resulting from above reaction was washed three times with deionized water, the phase separation was slow. The organic phase was then concentrated using a rotary evaporator. The remaining solvents were removed at 85° C. under reduced pressure (ca. 1 mbar) and stirring for 2 hours and a yellow, viscous polymer was obtained.

A.14.2 Synthesis of TBox #2.2

Versalink P-1000 and Jeffamin D2000 (Soft Segment Ratio 87.5:12.5) and Isophorone Diamine (IPDA), Resulting in about 67% to 73% Soft Fragments Content In a 4 L standard apparatus 95.45 g (3.0514 mol) of paraformaldehyde and 158.32 g (0.6935 mol) of Bisphenol A were weighted in as starting materials. After the addition of 300 nil of toluene and 2 min stirring at room temperature a cloggy suspension was observed. Now a solution of 38.00 g (0.2231 mol) IPDA in 50 ml toluene was added without cooling within 3 min at room temperature. A temperature rise from 20.7° C. to 25.9° C. was observed. Afterwards a solution of 57.75 g (0.0283 mol) Jeffamine D-2000 in 100 ml toluene was added without cooling within fife minutes. No further temperature rise was observed. Afterwards a solution of 404.25 g (0.3265 mol) Versalink P-1000 in 200 ml toluene was added within 10 minutes without cooling. The temperature stayed below 26° C. during the addition. The cloggy reaction mixture was then heated to reflux conditions for 6 hours.

The solution resulting from above reaction was washed three times with deionized water, the phase separation was slow. The organic phase was then concentrated using a rotary evaporator. The majority of the remaining solvents were removed at 85° C. under reduced pressure (ca. 1 mbar) and stirring for 2 hours. 1057 g of product (yellow, viscous) were obtained.

A.14.2 Synthesis of TBox #2.3

Versalink P-1000 and Jeffamin D2000 (Soft Segment Ratio 87.5:12.5) with 4,4'-Methylenbis(2,6-diethylaniline) (Lonzacure M-DEA), Resulting in about 67% to 73% Soft Fragments Content In a 2 L standard apparatus 41.83 g (1.3371 mol) of paraformaldehyde and 83.25 g (0.3647 mol) of Bisphenol A were weighted in as starting materials. After the addition of 150 ml of toluene and 2 min stirring at room temperature a cloggy suspension was observed. Now a solution of 30 g (0.0966 mol) Lonzacure M-DEA in 120 ml toluene was added without cooling within 2 min at room temperature. Afterwards a solution of 33.75 g (0.0165 mol) Jeffamine D-2000 in 40 ml toluene was added without cooling within three minutes. Afterwards a solution of 236.25 g (0.1908 mol) Versalink P-1000 in 200 ml toluene was added within 5 minutes without cooling. The temperature stayed below 26° C.

during the addition of all the different diamine solutions. The cloggy reaction mixture was afterwards heated to reflux conditions for 6 hours.

The solution resulting from above reaction was washed three times with deionized water, the phase separation was slow. The organic phase was then concentrated using a rotary evaporator. The majority of the remaining solvents were removed at 85° C. under reduced pressure (ca. 1 mbar) and stirring for 2 hours. 300 g of product (yellow, viscous) were obtained.

Synthesis of TBox with Lower Soft Fragment Content
A.15 Synthesis of TBox #15
Jeffamin D2000 with Bisphenol A and Isophorone Diamine (IPDA), Resulting in about 38% to 42% Soft Fragment Content In a 2 L standard apparatus 80.08 g paraformaldehyde (95%) in 100 ml ethyl acetate was cooled with ice. Under a nitrogen gas atmosphere, a solution of 164.50 g Jeffamin D2000 in 100 ml toluene was added dropwise and slowly at max. 10° C. A solution of 85.50 g isophorone diamine (IPDA) in 100 ml toluene and a solution of 132.82 g bisphenol A in 190 ml ethyl acetate were added likewise. The milky, hazy reaction mixture was then heated and maintained under reflux conditions. The reaction was terminated after 4.5 hours.

The solution resulting from above reaction was washed three times with a warm solution of $NaHCO_3$/NaCl (containing 4 parts 1N $NaHCO_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. Remaining solvents were removed in a vacuum drying cabinet at 50° C.

388.03 g of product were obtained, corresponding to 99% of the theoretical yield (389.81 g).

A16. Synthesis of TBox #16
Jeffamin D2000 with Bisphenol A and Isophorone Diamine (IPDA), Resulting in about 28% to 32% Soft Fragment Content In a 2 L standard apparatus a slightly cloggy mixture of 35.79 g (1.1323 mol; 1.1323 eq) paraformaldehyde (95%) and 13.13 g (0.1617 mol; 0.1617 eq) formaldehyde solution (37% in water) in 100 ml toluene was cooled with ice. Under a $N_2$ atmosphere, a solution of 54.55 g (0.0273 mol; 0.0545 eq) Jeffamin D2000 in 70 ml toluene was added dropwise within 10 minutes at 3.0-6.4° C. A solution of 45.45 g (0.2669 mol; 0.5338 eq) isophorone diamine in 70 ml toluene was added dropwise within 10 minutes at 3.6-7.2° C. A solution of 67.14 g (0.2941 mol; 0.5882 eq) bisphenol A in 120 ml ethyl acetate was added within 12 minutes at 4.0-6.3° C. The very hazy reaction mixture was then heated and maintained under reflux conditions. The mixture was becoming viscous after 0.5 hour, and 200 ml of toluene were added. The mixture was slowly becoming clearer. While the reaction was progressing, the accumulating water was removed using a water separator. The volume of water obtained was 13 ml after 1 hour, 20 ml after 2 hours, 25 ml after 3.5 hours, and 25.5 ml after 5 hours. The reaction was terminated after 5 hours and the product was diluted with 300 ml of toluene. The temperature during the reaction ranged mainly between 73-75° C. and increased up to 82° C. in the end. The clear solution resulting from above reaction was washed once with a saturated aqueous solution of NaCl, three times with a warm solution of $NaHCO_3$/NaCl (containing 4 parts 1N $NaHCO_3$ in water and 1 part saturated NaCl solution in water), and three times with a ethanol/NaCl solution (containing 4 parts aqueous ethanol (10% ethanol) and 1 part saturated NaCl solution in water). The phase separations took place slowly. The organic phase was then dried over sodium sulfate, and concentrated using a rotary evaporator. Remaining solvents were removed in a vacuum drying cabinet at 45-55° C.

174.5 g of product were obtained, corresponding to 96.3% of the theoretical yield (181.2 g).

B. Production of Formulations of Curable Benzoxazine Macromonomers (TBox) as Tougheners in Matrices of Dibenzoxazines and Monobenzoxazines; Curing and Characterization Table 1, Table 2 and Table 5 relate to the aromatic MDA-phenyl benzoxazine (in the following MDA-PB) and a 6:4 (w/w) mixture of MDA-phenyl benzoxazine and N-phenyl benzoxazine (in the following B-Mix 6/4). Additionally Table 5 relates to a cycloaliphatic diepoxide for example commercially available under the tradename Cyracure UVR 6110 from Dow Chemical Company (in the following CY):

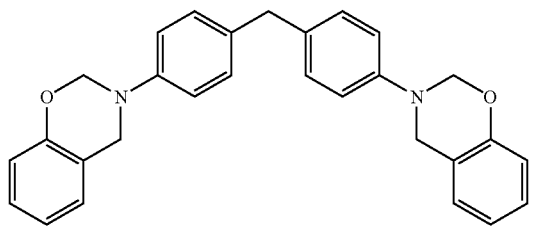

MDA-phenyl benzoxazine

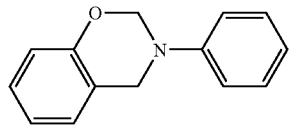

N-phenyl benzoxazine

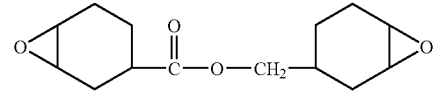

Cycloaliphatic diepoxide (CY)

Table 3 and Table 4 relate to the following aliphatic benzoxazine (in the following A-B);

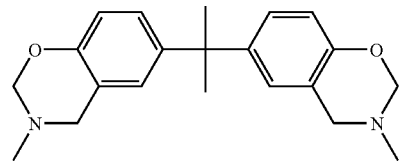

N-aliphatic Box resin A-B

Sample Preparation, Curing and Characterisation

In a 500 ml three-necked round bottom flask, 160 g of a benzoxazine resin and 40 g of a TBox compound were stirred under vacuum conditions (<1 mbar) at 100-115° C. (or at about 80° C. in the case of B-Mix 6/4) for about 15-30 minutes, until the TBox was dispensed homogeneously in the benzoxazine resin. The resulting product was stored in a closed container at room temperature. The products were cured in open molds in an autoclave (curing conditions according to WO 2007/064801 A1 as described on pp. 44-45, para. [0124] and [0125]). Then, the samples were taken out of the autoclave, released from the molds and cooled down at room temperature.

The cured samples were characterized using the following analytical methods:
Dynamic-mechanical-thermal analysis (DMTA) of samples cut to a size of 35 mm×10 mm×3.2 mm was performed according to WO 2007/064801 A1. The glass transition temperatures were obtained from the maximum value of the loss modulus vs. temperature diagrams. Flexural strength and flexural modulus were determined according to ASTM D790 using samples of a size of 90 mm×12.7 mm×3.2 mm, span=50.8 mm, speed=1.27 mm/min. K1c and G1c values were determined according to ASTM D5045-96 using so-called "single etch notch bending (SENB)" test specimens sized 56 mm×12.7 mm×3.2 mm.

Elongation was determined according to ASTM D638 using castings or plaques of neat resin formulation made by heating the resin formulation to 82° C. and pouring into an open face tool. The open face mold is cured in an autoclave using a 90 minute ramp (1.8° C. per minute) to 350 F (177° C.), hold at 177° C. for 3 hours and a one hour cool down to ambient temperature. The autoclave pressure during the entire cure process is 90 psi (0.62 MPa). The casting is removed from the tool, mounted into a surface grinder and the open face surface is removed in thin layers until the casting has a target thickness of 0.130 inches (3.3 mm). The casting is removed from the surface grinder and further machined to a "dogbone" shape described in ASTM D638. The sample shown above is mounted in a test frame and loaded in tension at 0.05 inches per minute (1.27 mm/min) at a constant cross-head speed. A load cell measures the load stress applied to the sample. A laser extensometer measures the change in length in the 2 inch (50.8 mm) gage length part of sample shown in the diagram above—this change in length compared to the original gage length is measured as elongation in % (strain is another term used to describe this dimensional change).

TABLE 1

Composition of the benzoxazine formulations in N-aromatic Box resins [% (w/w)]

| | Box resin | | Thermoplastic benzoxazine (TBox) | | | | | | | | | |
|---|---|---|---|---|---|---|---|---|---|---|---|---|
| | MDA-PB | B-Mix 6/4 | #1 | #2 | #3 | #4 | #5 | #6 | #7 | #8 | #9 | #10 |
| sample 1 | 100 | | | | | | | | | | | |
| sample 2 | 80 | | 20 | | | | | | | | | |
| sample 3 | 80 | | | 20 | | | | | | | | |
| sample 4 | 80 | | | | 20 | | | | | | | |
| sample 5 | 80 | | | | | 20 | | | | | | |
| sample 6 | 80 | | | | | | 20 | | | | | |
| sample 7 | 80 | | | | | | | 20 | | | | |
| sample 8 | 80 | | | | | | | | 20 | | | |
| sample 9 | 80 | | | | | | | | | 20 | | |
| sample 10 | 80 | | | | | | | | | | 20 | |
| sample 11 | 80 | | | | | | | | | | | 20 |
| sample 12 | | 100 | | | | | | | | | | |
| sample 13 | | 80 | 20 | | | | | | | | | |
| sample 14 | | 80 | | 20 | | | | | | | | |

TBox #1 to #7: Variation soft fragment - ratio of Versalink P-1000/Jeffamine D2000
TBox #8: TBox containing PDMS NH15/Versalink P-1000 as soft fragments
TBox #9 & #10: TBox containing PDMS NH40/Versalink P-1000 as soft fragments

TABLE 2

Material properties of the cured samples of Table 1

| | sample | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| DMTA-Tg [° C.] | 201 | 193 | 193 | 196 | 197 | 197 | n.d. | n.d. | 191 | 190 | 192 | 156 | 141 | 149 |
| Flexural strength [MPa] | 160 | 115 | 126 | 121 | 95 | 110 | n.d. | n.d. | 140 | 120 | 107 | 151 | 131 | 125 |
| Flexural Modulus [MPa] | 4400 | 3300 | 3150 | 2950 | 2750 | 1750 | n.d. | n.d. | 3150 | 2550 | 3250 | 4950 | 3500 | 3500 |
| Elongation | 1.06 | 3.17 | 3.52 | 3.42 | 2.99 | 3.31 | n.d. | n.d. | 3.14 | 2.92 | 1.62 | n.d. | n.d. | n.d. |
| K1c [MPa m$^{0.5}$] | 0.78 | 0.98 | 1.20 | 0.96 | 0.92 | 0.91 | n.d. | n.d. | 1.04 | 0.87 | 0.93 | 1.05 | 1.92 | 1.95 |
| G1c [J/m$^2$] | 109 | 252 | 396 | 274 | 267 | 264 | n.d. | n.d. | 299 | 260 | 236 | 197 | 924 | 954 |
| Compatibility | n.a. | yes | yes | yes | yes | yes | no* | no* | yes | yes | yes | n.a. | yes | yes |
| Transparency | yes | yes | (yes) | no | no | no | no | no | no | no | no | yes | (yes) | no |

*surface tack: strong macroscopic phase separation during curing
n.d.: not determined
n.a.: not applicable
(yes): slightly opaque The table shows that, dependent on the chemical structure of the TBox, homogeneous materials can be obtained that do not show any surface tack and thus possess good compatibility. In addition, some of the materials are even transparent and show a nanoscopic domain structure in TEM studies. The results of the material testing prove that the TBox can considerably increase the impact strength of the Box resin. This is particularly evident from the test results of samples 3, 13 and 14. At the same time, the glass transition temperature value is decreased only slightly. A very good result is the partly strong increase in elongation up to values of 3.5%.

Samples 2, 4 and 6 were exemplarily examined with respect to their morphology using electron microscopy (SEM and TEM; for TEM, samples were contrasted with ruthenium tetroxide or osmium tetroxide). It was observed that during curing, the TBox undergo a phase separation which can be controlled by the molecular structure of the TBox. Discrete domains are formed whose diameter can be adjusted by varying the chemical composition of the TBox. If the domains are very small, the samples appear transparent after curing.

TABLE 3

Composition of the benzoxazine formulations [% (w/w)] with the N-aliphatic Box resin A-B

| | Box resin | thermoplastic benzoxazine (TBox) | | | | | | |
|---|---|---|---|---|---|---|---|---|
| | A-B | #5 | #6 | #7 | #10 | #11 | #12 | #13 |
| sample 15 | 100 | | | | | | | |
| sample 16 | 80 | 20 | | | | | | |
| sample 17 | 80 | | 20 | | | | | |
| sample 18 | 80 | | | 20 | | | | |
| sample 19 | 80 | | | | 20 | | | |
| sample 20 | 80 | | | | | 20 | | |
| sample 21 | 80 | | | | | | 20 | |
| sample 22 | 80 | | | | | | | 20 |

TBox #5 to #7: Variation soft fragment ratio Versalink P-1000/Jeffamine D2000
TBox #10: TBox with PDMS NH40 and Versalink P-1000
TBox #11 and #12: TBox with PBD soft fragment of PU component and Versalink P-1000
TBox #13: TBox with PBD soft fragment of PU component and Jeffamin D2000

TABLE 4

Material properties of the cured formulations of Table 3

| | Sample | | | | | | | |
|---|---|---|---|---|---|---|---|---|
| | 15 | 16 | 17 | 18 | 19 | 20 | 21 | 22 |
| DMTA-Tg [° C.] | 187 | 186 | 186 | 185 | 194 | 190 | 193 | 192 |
| Flexural Strength [MPa] | 106 | 125 | 103 | 96 | 131 | 105 | 97 | 119 |
| Flexural Modulus [MPa] | 4400 | 3000 | 2950 | 2900 | 3200 | 3000 | 3100 | 2800 |
| K1c [MPa m$^{0.5}$] | 0.76 | 0.74 | 0.76 | 0.68 | 0.96 | 1.11 | 1.05 | 1.20 |
| G1c [J/m$^2$] | 114 | 162 | 172 | 138 | 253 | 361 | 317 | 453 |
| Compatibility | n.a. | yes | yes | yes | yes | yes | yes | yes |
| Transparency | yes | yes | yes | yes | (yes) | yes | yes | yes | n.a.: not applicable
(yes): slightly opaque

The table shows that, using A-B, a good compatibility can be achieved considerably easier than using N-aromatic benzoxazines. Virtually all samples are not only compatible, but also transparent.

TABLE 5

Composition of the benzoxazine formulations [% (w/w)] with the N-aliphatic Box resin A-B, the N-aliphatic Box resin A-B and an epoxide resin

| | Box resin | | Epoxy | thermoplastic | | | |
|---|---|---|---|---|---|---|---|
| | MDA-PB | B-Mix 6/4 | resin CY | benzoxazine (TBox) | | | |
| | | | | #2.1 | #2.2 | #2.3 | #3.1 |
| sample 23 | | 80 | 20 | | | | |
| sample 24 | | 80 | | 20 | | | |
| sample 25 | | 80 | | | | | 20 |
| sample 26 | | 60 | 20 | 20 | | | |
| sample 27 | | 60 | 20 | | | | 20 |
| sample 28 | 80 | | | | | 20 | |
| sample 29 | | 82.7 | | | 17.3 | | |

TBox #2.1 and 3.1: TBox with diamine-diphenol Stoichiometry of 1:1.2
TBox #2.2 and 2.3: TBox similar to Tbox#2 having a slightly reduced soft segment content of approx. 70%

TABLE 6

Material properties of the cured formulations of Table 5

| | Sample | | | | | | | |
|---|---|---|---|---|---|---|---|---|
| | 23 | 24 | 25 | 26 | 27 | 28 | 29 | 22 |
| DMTA-Tg [° C.] | n.d. | 152 | 157 | 196 | 202 | 202 | 155 | 192 |
| Flexural Strength [MPa] | n.d. | 140 | 135 | 120 | 135 | 100 | 160 | 119 |
| Flexural Modulus [MPa] | n.d. | 4140 | 4000 | 3650 | 3450 | 3380 | 4620 | 2800 |
| K1c [MPa m$^{0.5}$] | n.d. | 1.82 | 1.71 | 1.12 | 1.08 | 1.30 | 1.42 | 1.20 |
| G1c [J/m$^2$] | n.d. | 713 | 648 | 303 | 303 | 441 | 387 | 453 |
| Compatibility | yes | yes | yes | yes | yes | yes | yes | yes |
| Transparency | yes | yes | opacue | opaque | (yes) | yes | yes | yes | n.a.: not applicable
(yes): slightly opaque

The invention claimed is:

1. A curable benzoxazine macromonomer containing at least 3 benzoxazine rings and at least one aliphatic, heteroaliphatic, araliphatic, heteroaraliphatic, aromatic or heteroaromatic fragment, the fragment comprising a shortest atom chain containing at least 40 consecutive atoms between two benzoxazine nitrogen atoms or between two benzoxazine oxygen atoms, and said atom chain must not include any oxazine ring atoms ("soft fragment").

2. The curable benzoxazine macromonomer according to claim 1, wherein a part of the at least 3 benzoxazine rings has an open structure.

3. The curable benzoxazine macromonomer of claim 1, wherein the fragment comprising the shortest atom chain containing at least 40 consecutive atoms between two benzoxazine nitrogen atoms or between two benzoxazine oxygen atoms has a glass transition temperature of less than about 100° C.

4. The curable benzoxazine macromonomer according to claim 1, wherein the fragment comprising the shortest atom chain containing at least 40 consecutive atoms between two benzoxazine nitrogen atoms or between two benzoxazine oxygen atoms is derived from the primary polyamine and/or the polyphenol and said primary polyamine and/or polyphenol having a weight average molecular weight of at least about 600 to about 20,000 g/mol.

5. The curable benzoxazine macromonomer according to claim 1 having a weight average molecular weight from about 2,000 g/mol to about 1,000,000 g/mol.

6. The curable benzoxazine macromonomer according to claim 1 further containing at least one aliphatic, heteroaliphatic, araliphatic, hetereoaraliphatic, aromatic or heteroaromatic fragment, the fragment comprising a shortest atom chain containing less than 40 consecutive atoms between two benzoxazine nitrogen atoms or between two benzoxazine oxygen atoms, and said atom chain must not include any oxazine ring atoms ("rigid fragment").

7. The curable benzoxazine macromonomer according to claim 1, wherein the content of the soft segment in % by weight based on the total weight of the benzoxazine macromonomer is at least about 70% by weight.

8. A method of preparing a curable benzoxazine macromonomer in a solvent, the reactants including at least one polyphenol, at least one primary polyamine and formaldehyde or a reactant releasing formaldehyde, comprising steps
    (a) combining said reactants,
    (b) heating the mixture of said reactants under reflux,
    (c) removing water from the reaction mixture, and
    (d) separating the curable benzoxazine macromonomer from the solvent, whereby
       i. at least one of the polyphenols is such, that the shortest atom chain between two phenolic hydroxyl groups contains at least 40 atoms; and/or
       ii. at least one of the primary polyamines is such, that the shortest atom chain between two primary amino groups contains at least 40 atoms.

9. A curable formulation containing the curable benzoxazine macromonomers of claim 1 or prepared according to the method of claim 8.

10. The curable formulation according to claim 9, containing at least about 80% by weight of the curable benzoxazine macromonomers based on the total amount of curable ingredients.

11. The curable formulation according to claim 9, containing less than 80% by weight of the curable benzoxazine macromonomers based on the total amount of curable ingredients.

12. The curable formulation according to claim 9, containing other curable ingredients than the curable benzoxazine macromonomers selected from the group comprising dibenzoxazines, monobenzoxazines, epoxy resins, phenol resins, maleinimide resins, oxazolines and isocyanates.

13. The curable formulation according to claim 12, wherein the curable ingredients other than the curable benzoxazine macromonomers are selected from the group of aliphatic dibenzoxazines, aromatic dibenzoxazines, aliphatic monobenzoxazines, aromatic monobenzoxazines and mixtures thereof.

14. The curable formulation according to claim 9, said formulation being an adhesive, sealant or coating.

15. A cured product obtained by heat-curing the curable formulation according to claim 9.

* * * * *